(12) United States Patent
Kozu

(10) Patent No.: US 8,376,546 B2
(45) Date of Patent: Feb. 19, 2013

(54) PROGRESSIVE-ADDITION LENS, METHOD FOR PREPARING SHAPE DATA THEREOF, METHOD FOR MANUFACTURING THE LENS, AND APPARATUS AND COMPUTER PROGRAM PRODUCT FOR PREPARING SUCH SHAPE DATA

(75) Inventor: Kazuma Kozu, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/093,239

(22) Filed: Apr. 25, 2011

(65) Prior Publication Data

US 2011/0199573 A1 Aug. 18, 2011

Related U.S. Application Data

(63) Continuation of application No. 12/512,445, filed on Jul. 30, 2009, now Pat. No. 8,100,529.

(30) Foreign Application Priority Data

Jul. 31, 2008 (JP) ................................. 2008-198887

(51) Int. Cl.
*G02C 7/06* (2006.01)
(52) U.S. Cl. .......... 351/159.42; 351/159.45; 351/159.74
(58) Field of Classification Search ............. 351/159.42, 351/159.45, 159.74–159.77
See application file for complete search history.

(56) References Cited

U.S. PATENT DOCUMENTS

| | | | |
|---|---|---|---|
| 4,613,217 A | 9/1986 | Fuerter et al. | |
| 5,272,495 A | 12/1993 | Pedrono | |
| 5,854,669 A | 12/1998 | Altheimer et al. | |
| 6,123,422 A | 9/2000 | Menezes et al. | |
| 6,220,705 B1 | 4/2001 | Francois et al. | |
| 2006/0050236 A1 | 3/2006 | Menezes | |
| 2010/0141893 A1 | 6/2010 | Altheimer et al. | |
| 2010/0201941 A1 | 8/2010 | Gupta et al. | |
| 2010/0296055 A1 | 11/2010 | Esser et al. | |

FOREIGN PATENT DOCUMENTS

| | | |
|---|---|---|
| AU | B-56227/94 | 7/1994 |
| EP | 0 969 309 A1 | 1/2000 |
| JP | 57-10112 | 1/1982 |
| JP | 7-504769 | 5/1995 |
| WO | WO 02/084382 A2 | 10/2002 |
| WO | WO 02/084382 A3 | 10/2002 |
| WO | WO 2007/063365 A1 | 6/2007 |

*Primary Examiner* — Scott J Sugarman
(74) *Attorney, Agent, or Firm* — Oblon, Spivak, McClelland, Maier & Neustadt, L.L.P.

(57) ABSTRACT

In a progressive-addition lens having a progressive surface on one side and an aspherical or atoroidal surface on the other side, the lens shape is designed so that a high degree of aberration correction can be carried out on the periphery of the lens and the distance power and addition power of the lens acting on the eye of a wearer substantially correspond to the distance power and addition power measured by a lens meter. A progressive-addition lens includes a progressive surface and an aspherically designed surface formed of an aspherical or atoroidal surface, and the reference point of the aspherically designed surface is located in the vertical direction of the lens below a prism reference point of the progressive surface and above a near design reference point.

13 Claims, 16 Drawing Sheets

CONVEX (PROGRESSIVE SURFACE)

SURFACE ASTIGMATISM

SURFACE MEAN POWER

HEIGHT

CONCAVE (ASPHERIC SURFACE)

SURFACE ASTIGMATISM

SURFACE MEAN POWER

HEIGHT

TRANSMISSIVE DIOPTRIC POWERS (ON REFERENCE SPHERICAL SURFACE)

ASTIGMATISM

POWER ERROR

CONVEX (PROGRESSIVE SURFACE)

SURFACE ASTIGMATISM

SURFACE MEAN POWER

HEIGHT

CONCAVE (ATOROIDAL SURFACE)

SURFACE ASTIGMATISM

SURFACE MEAN POWER

HEIGHT

TRANSMISSIVE DIOPTRIC POWERS (ON REFERENCE SPHERICAL SURFACE)

ASTIGMATISM

POWER ERROR

TRANSMISSIVE DIOPTRIC POWERS (ON REFERENCE SPHERICAL SURFACE)

ASTIGMATISM

POWER ERROR

ATOROIDAL SURFACE

SURFACE ASTIGMATISM

TOROIDAL SURFACE

POWER CHANGE ON Y AXIS

DD=DN=0

CONVEX (PROGRESSIVE SURFACE)

SURFACE ASTIGMATISM

SURFACE MEAN POWER

HEIGHT

CONCAVE (SPHERIC SURFACE)

SURFACE ASTIGMATISM

SURFACE MEAN POWER

HEIGHT

TRANSMISSIVE DIOPTRIC POWERS (ON REFERENCE SPHERICAL SURFACE)

ASTIGMATISM

POWER ERROR

CONVEX (PROGRESSIVE SURFACE)

SURFACE ASTIGMATISM

SURFACE MEAN POWER

HEIGHT

CONCAVE (TOROIDAL SURFACE)

SURFACE ASTIGMATISM

SURFACE MEAN POWER

HEIGHT

TRANSMISSIVE DIOPTRIC POWERS (ON REFERENCE SPHERICAL SURFACE)

ASTIGMATISM

POWER ERROR

PROGRESSIVE-ADDITION LENS, METHOD FOR PREPARING SHAPE DATA THEREOF, METHOD FOR MANUFACTURING THE LENS, AND APPARATUS AND COMPUTER PROGRAM PRODUCT FOR PREPARING SUCH SHAPE DATA

BACKGROUND OF THE INVENTION

1. Field of the Invention

The present invention relates to a progressive-addition lens having a progressive surface as one surface and an aspherical or atoroidal surface as the other surface and to a method for preparing shape data thereof. In addition, the present invention relates to a method for manufacturing such a progressive-addition lens, an apparatus for preparing the shape data, and a computer program product for preparing the shape data.

2. Description Related Art

A progressive-addition lens having a portion with power for distance viewing and a portion with power for near viewing, where dioptric power is continuously changed from one portion to the other portion, has been developed. The progressive-addition lens is mainly used as a lens for far-sighted spectacles and is apparently indistinguishable from typical far-sighted spectacles, while having an advantage that clear vision can be continuously obtained from a distance to a hand. In recent years, therefore, the progressive-addition lenses have been widely used in general.

The surface configuration of the progressive-addition lens includes a progressive surface on an object-side surface (front surface) and a spherical or toroidal surface (astigmatic surface) on an eye-side surface (back surface). Alternatively, another surface configuration of the progressive-addition lens has been known in the art, where a spherical surface is arranged on the object-side surface (front surface), and a progressive surface or a synthetic surface of a progressive surface with a toroidal surface is arranged on the eye-side surface (back surface). In addition, there is proposed that the spherical or toroidal surface formed on one of the surfaces is constructed of an aspherical or atoroidal surface to carry out aberration correction based on prescribed power (e.g., correction of astigmatism, field curvature, or distortion aberration) in a region on the periphery side of the lens (see, for example, Patent Documents 1 and 2).

Furthermore, in the present specification, the curved surface which is a portion of a rotation surface having a rotation axis and in which the curvature continuously changes from the intersection with the rotation axis to the periphery is referred to as an aspherical surface. The curved surface which has a principal meridian showing maximum curvature and a principal meridian showing minimum curvature and which is a part of a line-symmetric curved surface with respect to a normal line at the intersection of the principal meridians as a symmetric axis and in which the curvature of one of the principal meridians continuously changes toward the outside from the intersection with the other principal meridian is referred to as an atoroidal surface. Also, a progressive-addition lens provided with a progressive surface only on one side is referred to as a one-side progressive-addition lens. In addition, the other side of the one-side progressive-addition lens, which is opposite to the progressive surface and which is formed of a spherical or toroidal surface is also referred to as a spherically designed surface, and the surface formed of an aspherical or atoroidal surface is also referred to as an aspherically designed surface. In addition, the one-side progressive-addition lens having a spherically designed surface on the side opposite to the progressive surface may be referred to as a spherically designed one-side progressive-addition lens, while one having an aspherically designed surface is referred to as an aspherically designed one-side progressive-addition lens.

In particular, the aspherically designed one-side progressive-addition lens can be provided with corrected astigmatism on the lens periphery side to improve the optical characteristics thereof that act on the eye, while the thickness of the lens can be reduced.

[Patent Document 1] National Publication of International Patent Application No. 1995-504769
[Patent Document 2] Japanese Unexamined Patent Application Publication No. 57-10112

SUMMARY OF THE INVENTION

The optical performance of a progressive-addition lens can be numerically represented by distance power (back vertex power, hereinafter, also referred to as distance dioptric power), distance cylinder axis direction, addition power (in general, a difference between mean near power and mean distance power measured by placing the progressive surface against the lens support of a lens meter, hereinafter, also referred to as addition dioptric power), prismatic power (hereinafter, also referred to as prism dioptric power), prism base setting, and the like. These design values of each lens are indicated on a lens package, attached paper, lens itself, and the like (hereinafter, these optical performance values indicated for the lens will be also referred to as indicated values).

The measurement methods for these optical performance values and the allowable tolerances of indicated values of the optical performance values are defined in Japanese Industrial Standard (for example, JIS T7331 and JIS T7315) or in international standard (for example, ISO14889 and ISO8980-2).

Note that in the present specification, when a prism power includes only one of prescribed prism power and prism thinning, the prism power refers to the one of prescribed prism power and prism thinning, and when a prism power includes both of prescribed prism power and prism thinning, it refers to the prism power in which the prescribed prism power and prism thinning has been integrated.

For the distributing side of spectacle lenses and glasses (e.g., spectacle stores, ophthalmic hospitals, lens makers, and lens-maker factories for custom-made lenses), there is a need of measuring the optical performance of lenses to determine whether the optical performance of the lens corresponds to the indicated values on the lens, whether the optical performance of the lens corresponds to the prescription of a wearing person, and the like. The measurement of such optical performance is carried out using a lens meter or a measuring apparatus capable of obtaining measurement values comparable to those obtained by the lens meter according to the measuring method defined by the above-described JIS or ISO or another measuring method conforming to JIS or ISO.

By the way, when the progressive-addition lens is an aspherically designed one-side progressive-addition lens, one side thereof is aspherically designed. Thus, the power of the lens which actually acts on the eye on the wearing position may be different from the power measured by the lens meter. Therefore, for the aspherically designed one-side progressive-addition lens, the prescribed distance power and addition power (hereinafter, also referred to as prescribed powers) and the measured distance power and addition power (hereinafter, also referred to as check dioptric power) have been described on the package or attached paper of the lens.

In this way, the aspherically designed one-side progressive-addition lens has both the prescribed power and the check dioptric power per lens. Thus, confusion may have been caused on the distributing side when inspecting a lens or when selecting a lens according to the prescription of a wearer.

The present invention has been made in consideration of the aforementioned problem, and in a progressive-addition lens having a progressive surface on one side and an aspherically designed surface on the other side, it is enabled to carry out aberration correction based on prescribed power and to design the shape of the lens such that the measured distance power and addition power substantially agree with their respective prescribed powers.

For solving the above problems, according to the present invention, a progressive-addition lens includes a progressive surface; and an aspherically designed surface formed of an aspherical or atoroidal surface. The reference point of the aspherically designed surface is located in the vertical direction of the lens below a prism reference point of the progressive surface and above a near design reference point.

In addition, the present invention provides a method for preparing shape data of a progressive-addition lens having a progressive surface and an aspherically designed surface formed of an aspherical or atoroidal surface. The method includes the following steps:

(a) forming the aspherically designed surface so that a reference point of the aspherically designed surface is located on a normal line at a prism reference point of the progressive surface;

(b) moving the aspherically designed surface so that the reference point of the aspherically designed surface is located in a vertical direction of the lens below the prism reference point, thereby placing an addition power of the lens measured by a lens meter in a predetermined allowable tolerance of an addition power provided as a prescribed power of the lens; and (c) deforming the aspherically designed surface so that a distance power of the lens measured by the lens meter is placed in a predetermined allowable tolerance of a distance power provided as a prescribed power of the lens.

In addition, the present invention provides a method for manufacturing a progressive-addition lens having a progressive surface and an aspherically designed surface formed of an aspherical or atoroidal surface. The method includes the steps of preparing lens shape data in response to an order; and forming a lens based on the lens shape data prepared by the step of forming lens shape data. The step of preparing lens shape data includes the above-described steps (a) to (c).

In addition, the present invention provides an apparatus for preparing shape data of a progressive-addition lens having a progressive surface and an aspherically designed surface formed of an aspherical or atoroidal surface. The apparatus includes the following devices:

(A) a device configured to form the aspherically designed surface so that a reference point of the aspherically designed surface is located on a normal line at a prism reference point of the progressive surface;

(B) a device configured to move the aspherically designed surface so that the reference point of the aspherically designed surface is located in a vertical direction of the lens below the prism reference point, thereby placing an addition power of the lens measured by a lens meter in a predetermined allowable tolerance of an addition power provided as a prescribed power of the lens; and (C) a device configured to deform the aspherically designed surface so that a distance power of the lens measured by the lens meter is placed in a predetermined allowable tolerance of a distance power provided as a prescribed power of the lens.

Furthermore, the present invention provides a computer program product for designing shape data for preparing shape data of a progressive-addition lens having a progressive surface and an aspherically designed surface formed of an aspherical or atoroidal surface. The computer program product is designed to allow a computer to realize the functions of the above-described devices (A) to (C).

As described above, the progressive-addition lens of any aspect of the present invention includes a progressive surface; and an aspherically designed surface formed of an aspherical or atoroidal surface, where the reference point of the aspherically designed surface is located in the vertical direction of the lens below a prism reference point of the progressive surface and above a near design reference point.

In contrast, when a conventional progressive-addition lens is provided with an aspherically designed surface formed of an aspherical or atoroidal surface on one surface, the reference point of the aspherically designed surface (the reference point of the aspherical surface or the reference point of the atoroidal surface) is located on the lens back surface corresponding to a prism reference point of the progressive surface. The surface power of the lens back surface in a predetermined direction on the vertical cross section passing through the prism reference point is symmetrically distributed with respect to the normal line of the lens front surface (progressive surface) at the prism reference point as the center axis. On the other hand, a distance between a distance reference point and a prism reference point is not generally equal to a distance between a near design reference point and the prism reference point. The distance between the near design reference point and the prism reference point is slightly longer than the former. Thus, the surface powers of the back surface on the point on the back surface corresponding to the distance reference point and the point on the back surface corresponding to the near design reference point are different from each other, and this may be a factor of causing a difference between the addition power measured by a lens meter and the prescribed addition power.

In contrast, as described above, in the progressive-addition lens of any aspect of the present invention, the difference between the surface power at the point on the back surface corresponding to the distance reference point and the surface power at the point on the back surface corresponding to the near design reference point can be reduced, because the reference point of the aspherically designed surface is located in the vertical direction of the lens below a prism reference point of the progressive surface and above a near design reference point. Thereby, it becomes possible to avoid a difference between the addition power measured by a lens meter and the prescribed addition power, which is caused by the formation of an aspherical or atoroidal surface.

As described above, according to the method for preparing shape data of a progressive-addition lens, the method for manufacturing the progressive-addition lens, the apparatus for preparing shape data of the progressive-addition lens, and the computer program product for preparing the shape data of the progressive-addition lens, according to the present invention, the reference point of an aspherically designed surface is located in the vertical direction of the lens below a prism reference point of a progressive surface and above a near design reference point. Thus, the effect of aberration correction by aspherical surface design can be obtained, and in addition, a difference between the addition power measured by a lens meter and the prescribed addition power can be avoided.

According to the present invention, in a progressive-addition lens having a progressive surface and an aspherically designed surface formed of an aspherical or atoroidal surface, in particular, aberration correction based on the prescribed power is carried out in a region on the lens periphery side. In addition, a lens in which measured distance power and addition power substantially agree with the prescribed distance power and addition power can be obtained. Thereby, there is no need of additionally indicating the check dioptric power on the lens, and the optical performance of the lens can be easily examined.

BRIEF DESCRIPTION OF THE DRAWINGS

FIG. 1 is a diagram illustrating an aspherically designed one-side progressive-addition lens for the left eye in accordance with an embodiment of the present invention, where

FIG. 5 is a diagram for explaining a process for preparing shape data of an aspherically designed one-side progressive-addition lens according to an embodiment of the present invention, where

FIG. 6 is a diagram illustrating distributions on an exemplified progressive-addition lens having a progressive surface as a front surface (convex surface) and an aspherical surface as a back surface (concave surface), where

FIG. 7 is a diagram illustrating distributions on an exemplified progressive-addition lens having a progressive surface as a front surface (convex surface) and an atoroidal surface as a back surface (concave surface), where

FIG. 8 is a diagram illustrating astigmatism and power error of target performances (transmissive dioptric power of the reference spherical surface), where

FIG. 13 is a diagram illustrating a conventional aspherically designed one-side progressive-addition lens for the left eye, where

FIG. 15 is a diagram illustrating a conventional spherically designed one-side progressive-addition lens for the left eye, where

FIG. 17 is a diagram illustrating distributions on a comparative example of a conventional progressive-addition lens having a progressive surface as a front surface (convex surface) and a spherical surface as aback surface (concave surface), where

FIG. 18 is a diagram illustrating distributions on a comparative example of a progressive-addition lens having a progressive surface as a front surface (convex surface) and a toroidal surface as a back surface (concave surface), where

DESCRIPTION OF THE PREFERRED EMBODIMENTS

Although examples of the best mode for carrying out the present invention will be described in more detail below, the present invention is not limited to these examples.

First, referring now to the attached drawings, an aspherically designed one-side progressive-addition lens according to an embodiment of the present invention, and a conventional aspherically designed one-side progressive-addition lens and a conventional spherically designed one-side progressive-addition lens, as targets for comparison, will be described.

FIG. 1 illustrates an example of an aspherically designed one-side progressive-addition lens 10 for the left eye, where the front surface thereof is formed as a progressive surface, according to the embodiment of the present invention.

Figures 1A, 1B:
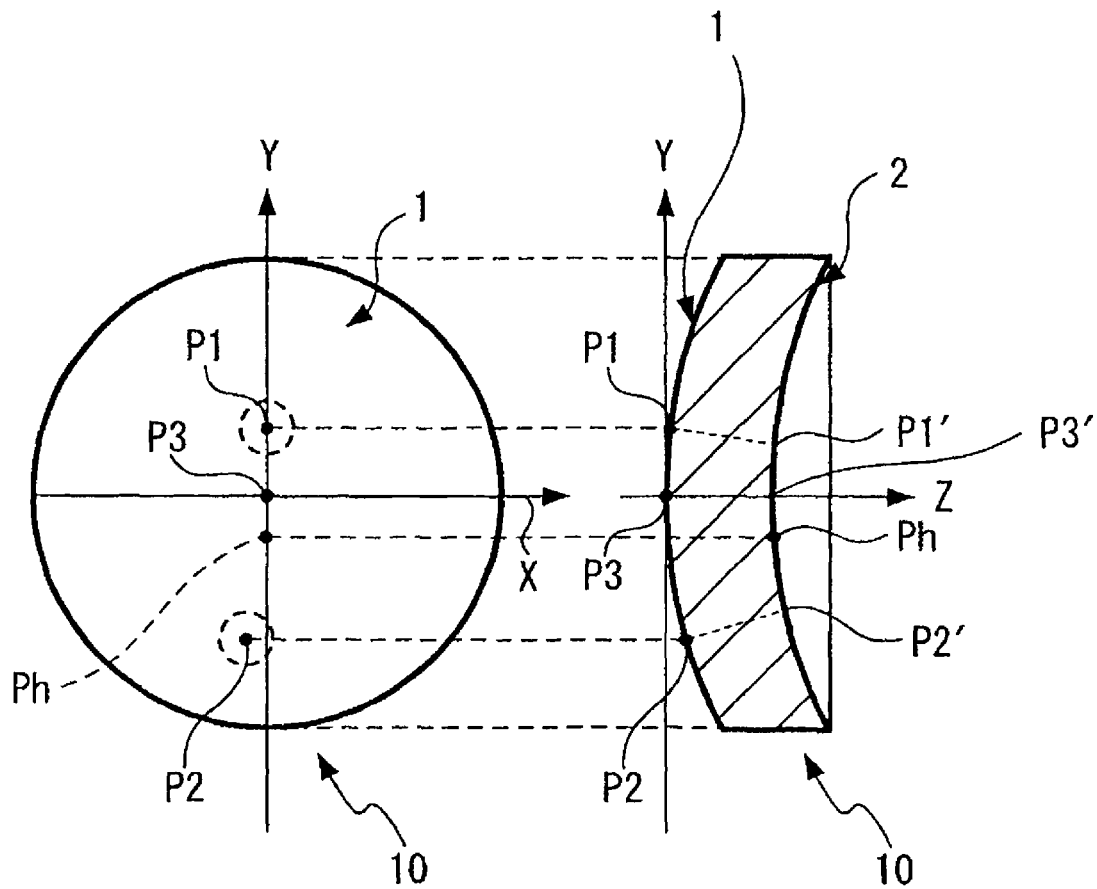
FIG. 1A is a schematic plan view of the lens viewing from the front surface thereof (side opposite to the eye ball)
FIG. 1B is a cross-section view thereof.

FIG. 1A is a schematic plan view of the lens 10 viewing from the front surface 1 thereof (i.e., the side opposite to the eyeball) and FIG. 1B is a cross-section view of the lens 10.

The lens shown in FIGS. 1A and 1B includes a progressive surface on the front surface 1 (on the side facing to an object) and an aspherical or atoroidal surface 2 on the back surface thereof (the side facing to the eyeball). In addition, a prism reference point P3 is arranged on the center of the front surface 1 of the lens 10. On the front surface 1 of the lens 10, furthermore, a distance reference point P1 is formed above the prism reference point P3 and a near design reference point P2 is formed below the prism reference point P3.

Here, a three-dimensional orthogonal coordinate system is defined as follows:

First, the prism reference point P3 is defined as an origin, a normal line at the prism reference point P3 on the front surface 1 of the lens 10 is defined as a Z axis. Then, a line passing through the prism reference point P3 and extending in the horizontal direction of the lens 10, which is perpendicular to the Z axis, is defined as an X axis. In addition, a line passing through the prism reference point P3 and extending in the vertical direction of the lens 10, which is perpendicular to the Z axis, is defined as a Y axis.

In the three-dimensional orthogonal coordinate system, in general, the near design reference point P2 is arranged at a position on the nose side (toward the middle of spectacles) in the X direction from the Y axis viewing from the front of the lens. The distance from the prism reference point P3 to the near design reference point P2 or the distance reference point P1 in the Y-axis direction (distance from the X-Y plane) viewing from the front of the lens is set so that the distance from the near design reference point P2 is longer than the distance from the distance reference point P1.

The lens 10 in the example shown in FIG. 1 has a circular shape in front view, and the prism reference point P3 is located at the center of the circle. In addition, the distance reference point P1 is located on the Y axis in front view of the lens.

Conventionally, by the way, lens manufacturers uniquely define the locations of the distance reference point P1, the near design reference point P2, and the prism reference point P3 from their own points of view based on optical design. These points P1, P2, and P3 may be identified with reference to permanent alignment reference markings (not shown) on the front surface 1 of the lens 10.

FIG. 1B is a cross-sectional view of the lens 10 in the Y-Z plane viewed from the X direction. As shown in the figure, the back surface 2 of the lens 10 has a point P1' that corresponds to the distance reference point P1 defined on the front surface 1 of the lens 10. Likewise, the back side 2 has a point P2' that corresponds to the near design reference point P2 and a point P3' that corresponds to the prism reference point P3.

Here, the point P1' on the back surface 2 (corresponding to the distance reference point P1) is an intersection between the back surface 2 and the normal line on the distance reference point P1 of the front surface 1 of the lens 10. In other words, the point P1' corresponds to an intersection between the optical axis of a lens meter and the back surface 2 when, in measuring the addition power of the lens 10 using the lens meter, the optical axis of the lens meter is aligned to the distance reference point P1 of the lens 10 while placing the front surface 1 (i.e., the progressive surface) of the lens 10 against a lens support of the lens meter.

The point P2' on the back surface 2 (corresponding to the near design reference point P2) is an intersection between the back surface 2 and the normal line on the near design reference point P2 of the front surface 1 of the lens 10. In other words, the point P2' corresponds to an intersection between the optical axis of the lens meter 10 and the back surface 2 when, in measuring the addition power, the optical axis of a lens meter is aligned to the near design reference point P2 of the lens 10 while placing the front surface 1 (i.e., the progressive surface) of the lens 10 against a lens support of the lens meter.

The point P3' on the back surface 2 (corresponding to the prism reference point P2) is an intersection between the back surface 2 of the lens 1 and the normal line (Z axis) on the prism reference point P3 of the front surface 1 of the lens 10.

In the progressive-addition lens 10 of the present embodiment, as shown in FIG. 1B, a reference point (aspherical surface reference point or atoroidal surface reference point) Ph of an aspherically designed surface (an aspherical surface or an atoroidal surface) as the back surface 2 of the lens 2 is located below the prism reference point P3 in the Y-axis direction (below the X-Z plane) in front view of the lens 10 and above the near design reference point P2 in the Y-axis direction (above a plane in parallel with the X-Z plane passing through the near design reference point P2). More preferably, the reference point Ph of the aspherically designed surface is located below the point P3' corresponding to the prism reference point P3 on the back surface 2 in the Y-axis direction (below the X-Z plane) in front view of the lens 10 and above the point P2' corresponding to the near design reference point P2 on the back surface 2 in the Y-axis direction (above a plane in parallel with the X-Z plane passing through the corresponding point P2' on the near design reference point P2).

Here in the present specification, when the aspherically designed surface is an aspherical surface, the reference point Ph of the aspherically designed surface is an intersection between the rotation axis of the aspherical surface and the back surface 2 of the lens 10. When the aspherically designed surface is an atoroidal surface, on the other hand, it is an intersection between two principal meridians on the atoroidal surface. The rotation axis of the aspherical surface is called a reference axis of the aspherical surface, the normal line at the intersection of two principal meridians on the atoroidal surface is called a reference axis of the atoroidal surface, and these reference axes are called reference axes of the aspherically designed surface.

The reference point Ph of the aspherically designed surface is preferably defined on the Y axis (on the Y-Z plane) in front view of the lens 10. More preferably, the reference point Ph is defined on a line connecting between the distance reference point P1 and near design reference point P2 (i.e., on a plane that passes through both the distance reference point P1 and the near design reference point P2 and that is in parallel with the Z axis). Note that the reference point Ph of the aspherically designed surface may be set on the nose side of the Y axis in front view of the lens and in a region on the ear side of a line connecting the distance reference point P1 and the near design reference point P2.

In addition, the power of the lens back surface at the point P1' on the back surface corresponding to the distance reference point P and the power of the lens back surface at the point P2' on the back surface corresponding to the near design reference point P2 are defined substantially equal to each other.

As the lens 10 is configured as described above, the addition power thereof, which is measured as an optical performance value by a lens meter, can be substantially matched to an addition power provided as a prescribed power or set in a predetermined allowable tolerance.

Further, the reference axis of the aspherically designed surface is preferably inclined downward toward the lens front surface side. With such configuration, prism power can be easily set in an allowable range.

Alternatively, the point P1' on the back surface (corresponding to the distance reference point P1) may be located at an intersection between the normal line of the lens back surface 2 passing through the distance reference point P1 and the lens back surface 2. In addition, alternatively, the point P1' on the back surface (corresponding to the distance reference point P1) may be located at an intersection between a line parallel to the Z-axis and passing through the distance reference point P1, and the back surface 2 of the lens 10. Alternatively, the point P2' on the back surface (corresponding to the near design reference point P2) may be located at an intersection between a line parallel to the Z-axis and passing through the near design reference point P2, and the back surface 2 of the lens 10.

Furthermore, the materials of the lens 10 of the present embodiment are not specifically limited. For examples, the lens 10 may be any of the conventional spectacle lenses made of plastic or glass materials.

Figures 13A, 13B:
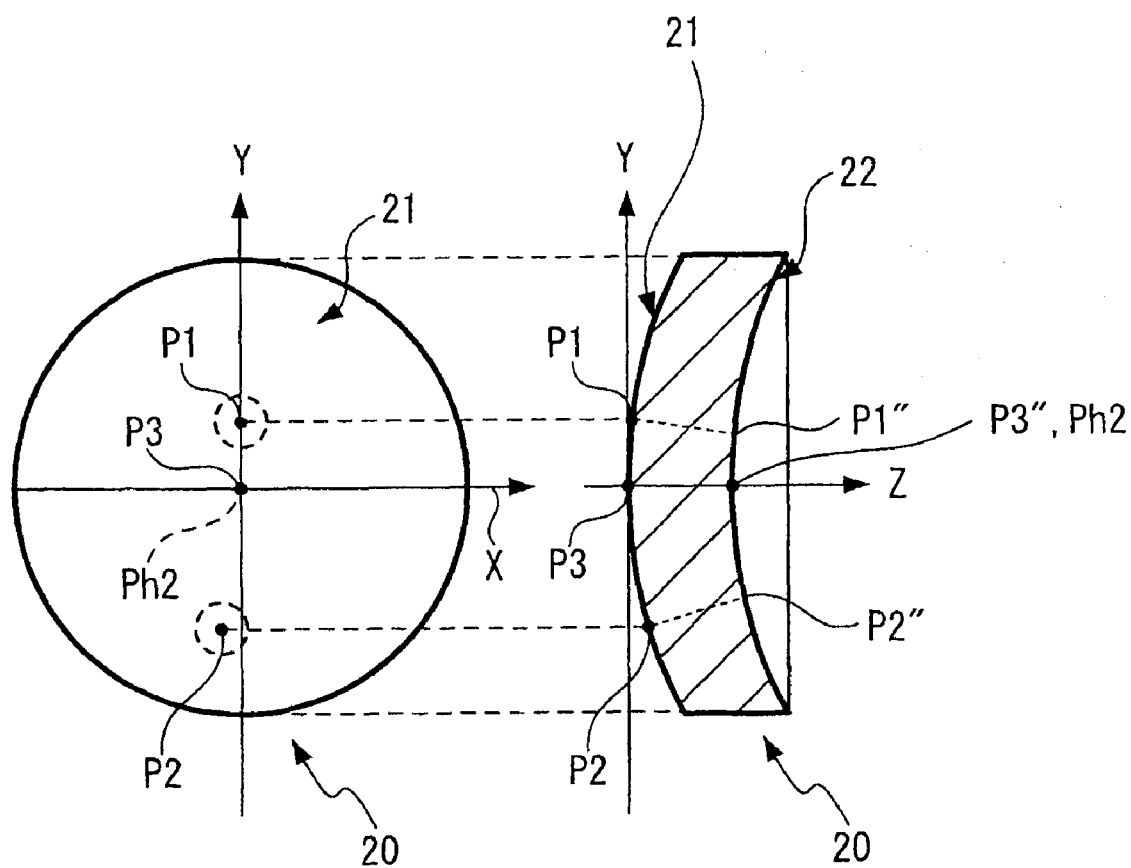
FIG. 13A is a schematic plan view of the lens viewing from the front surface thereof (side opposite to the eye ball)
FIG. 13B is a cross-section view thereof.

FIG. 13 is illustrates an example of a conventional left-eye aspherically designed one-side progressive-addition lens 20, which is prepared by providing the front surface thereof with a progressive surface. FIG. 13A is a plan view of the lens 20 in front view of a lens front surface 21 of the lens 20, and FIG. 13B is a cross-section view thereof.

The lens 20 illustrated in FIGS. 13A and 13B has the lens front surface 21 provided as a progressive surface and a lens back surface 22 provided as an aspherical surface or an atoroidal surface. The configuration of the lens front surface 21 is substantially the same as that of the front surface 1 of the lens 10 according to the embodiment of the present invention shown in FIG. 1 with respect to its face shape, position and direction in a three-dimensional orthogonal coordinate system, and positions of the respective points on the lens front surface 21 (distance reference point P1, near design reference point P2, and prism reference point P3). Therefore, the same reference numerals will be provided on the respective points and the descriptions thereof will be omitted.

FIG. 13B is a cross-section view of the lens 20, where the cross section along the Y-Z plane is viewed from the X-axis direction, and shows points on the back surface 22 thereof that correspond to the respective points on the lens front surface 21 thereof. That is, a point P1" on the back surface 22 corresponds to a distance reference point P1 on the lens front surface 21. Likewise, a point P2' on the back surface 22 corresponds to a near design reference point P2 on the lens front surface 21. A point P3" on the back surface 22 corresponds to a prism reference point P3 on the lens front surface 21.

Here, the point P1" on the back surface (corresponding to the distance reference point P1) is an intersection between the normal line of the lens front surface 21 at the distance reference point P1 and the lens back surface 22. The point P2" on the back surface (corresponding to the near design reference point P2) is an intersection between the normal line (Z axis) of the lens front surface 21 at the prism reference point P3 and the lens back surface 22.

Furthermore, as shown in FIG. 13B, the reference point Ph2 of the aspherically designed surface (the lens back surface 22) is defined on the same position as that of the prism reference point P3 in front view of the lens 20. In other words, the reference point Ph2 of the aspherically designed surface agrees with the position of the point P3" on the back surface (corresponding to the prism reference point P3). The reference axis of the aspherically designed surface is set in the direction in which a desired prism power can be obtained, and when the prism power is zero, it agrees with the Z axis.

Figures 15A, 15B:
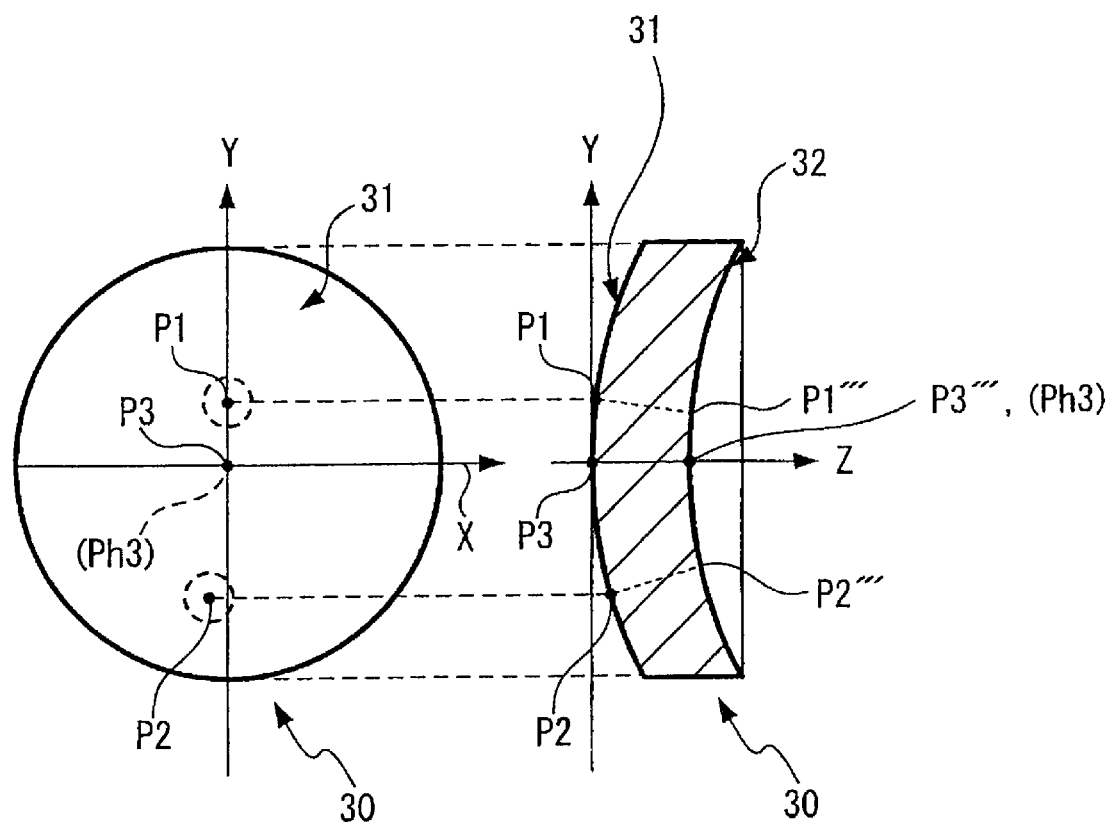
FIG. 15A is a schematic plan view of the lens viewing from the front surface thereof (side opposite to the eye ball)
FIG. 15B is a cross-section view thereof.

FIG. 15 is an example of a conventional left-eye spherically designed one-side progressive-addition lens 30, which is prepared by providing the front surface thereof with a progressive surface. FIG. 15A is a plan view of the lens 30 in front view of a front surface 31 of the lens 30, and FIG. 15B is a cross-section view thereof.

The lens 30 illustrated in FIGS. 15A and 15B has a lens front surface 31 provided as a progressive surface and a lens back surface 32 provided as a spherical surface or a toroidal surface. The configuration of the lens front surface 31 is substantially the same as that of the front surface 1 of the lens 10 shown in FIG. 1 according to the present invention, with respect to its face shape, position and direction in a three-dimensional orthogonal coordinate system, and positions of the respective points on the lens front surface 31 (distance reference point P1, near design reference point P2, and prism reference point P3). Therefore, the same reference numerals will be provided on the respective points and the descriptions thereof will be omitted.

FIG. 15B is a cross-section view of the lens 30, where the cross section along the Y-Z plane is viewed from the X-axis direction, and shows points on the lens back surface 32 that correspond to the respective points on the lens front surface 31. That is, a point P1''' on the lens back surface 32 corresponds to a distance reference point P1 on the lens front surface 31. Likewise, a point P2''' on the lens back surface 32 corresponds to a near design reference point P2 on the lens front surface 31. A point P3''' on the lens back surface 32 corresponds to a prism reference point P3 on the lens front surface 31.

Here, the point P1''' on the lens back surface (corresponding to the distance reference point P1) is an intersection between the normal line of the lens front surface 31 at the distance reference point P1 and the lens back surface 32. The point P2''' on the lens back surface (corresponding to the near design reference point P2) is an intersection between the normal line of the lens front surface 31 at the near design reference point P2 and the lens back surface 32. The point P3''' on the lens back surface (corresponding to the prism reference point P3) is an intersection between the normal line (Z-axis) of the lens front surface 31 at the prism reference point P3 and the lens back surface 32.

Furthermore, when the lens back surface 32 is a toroidal surface, the reference point Ph3 of the toroidal surface is set at the same position as that of the prism reference point P3 in front view of the lens 30 as shown in FIG. 15B. In other words, the reference point Ph3 of the toroidal surface agrees with the position of the point P3''' on the back surface (corresponding to the prism reference point P3). Here, in the present specification, the reference point Ph3 of the toroidal surface is an intersection between two principal meridians on the toroidal surface. Also, the normal line on the toroidal surface at the intersection is called a reference axis of the toroidal surface. The reference axis of the toroidal surface is set in the direction in which a desired prism power can be obtained, and when the prism power is zero, it agrees with the Z axis. Note that when the lens back surface 32 is a spherical surface, a line connecting the center of a sphere including the spherical surface and the point P3''' on the back surface (corresponding to the prism reference point P3) is set in the direction in which a desired prism power can be obtained, and when the prism power is zero, it agrees with the Z axis.

Next, the power of the aspherically designed surface of the aforementioned conventional aspherically designed one-side progressive-addition lens 20 and the power of the spherically designed surface of the aforementioned conventional spherically designed one-side progressive-addition lens 30 will be described with reference to the attached drawings.

The conventional aspherically designed one-side progressive-addition lens 20 as described herein includes a lens front surface provided as a progressive surface and a lens back surface provided as an atoroidal surface. The conventional spherically designed one-side progressive-addition lens 30 as described herein includes a lens front surface provided as a progressive surface and a lens back surface provided with a toroidal surface. The prescribed powers of each of these lenses 20 and 30 are as follows: With respect to distance power, a spherical surface power (also referred to as a spherical surface dioptric power) is 6.00 D, an astigmatic power (also referred to as a cylindrical dioptric power) is −3.00 D, and a cylinder axis is at an angle of 0°. An addition power is 2.00 D. A prism power is 0.00$\varDelta$. In addition, the curve of the lens front surface is 7.00 D, and the curve of the lens back surface is 4.19 D at maximum and 1.19 D at minimum (but, in the case of a progressive surface or an aspherically designed surface, the surface power varies among positions). Furthermore, the refractive index of the lens material is 1.60, and the thickness of the center of the lens is 6 mm.

Figure 14A:
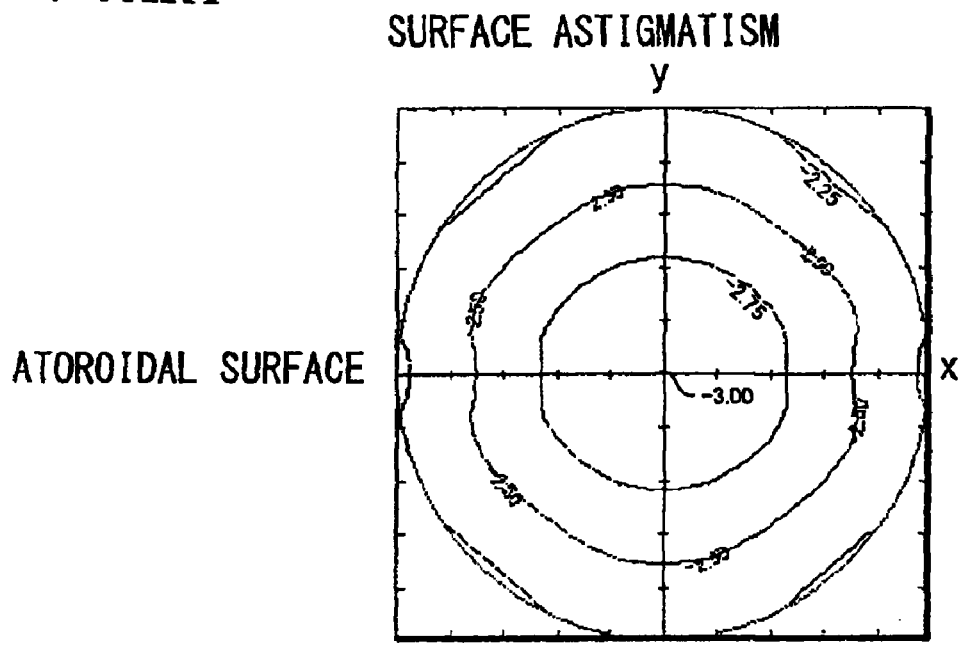
FIG. 14A and FIG. 14B are graphical representations of surface astigmatism and a change in dioptric power on the y axis of the back surface of a progressive-addition lens having an atoroidal surface as a back surface.
Figure 16A:
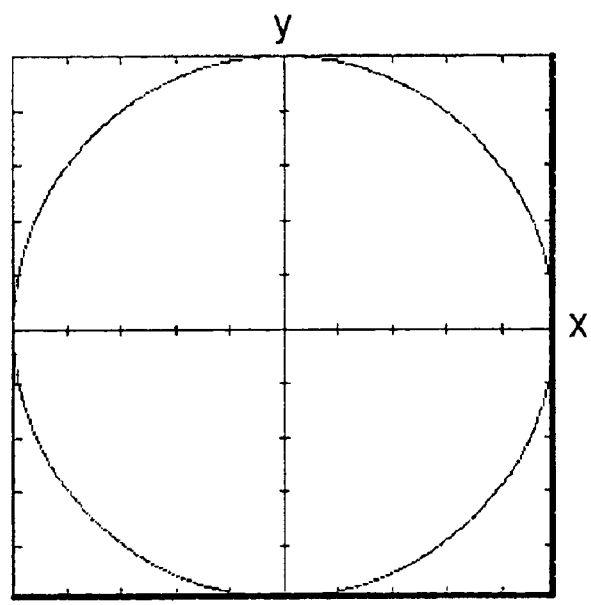
FIG. 16A and FIG. 16B are graphical representations of surface astigmatism and a change in dioptric power on the y axis of the back surface of a progressive-addition lens having a toroidal surface as a back surface.

FIG. 14A is a diagram illustrating on the x-y plane a distribution of the surface astigmatism of the lens back surface 22 of the aforementioned conventional aspherically designed one-side progressive-addition lens 20. FIG. 16A is a diagram illustrating on the x-y plane a distribution of the surface astigmatism of the lens back surface 32 of the aforementioned conventional spherically designed one-side progressive-addition lens 30.

Here, in each of FIG. 14A and FIG. 16A and also in each of FIGS. 6D to 6F, FIGS. 7D to 7F, FIGS. 17D to 17F, and FIGS. 18D to 18F, the x-y plane is a two-dimensional orthogonal coordinate system. That is, the x-y plane passes through the point (P3', P3", P3"') on the back surface, which corresponds to the prism reference point. In addition, the x-y plane is perpendicular to the normal line (z axis) of the lens back surface (2, 22, 32) at the point (P3', P3", P'") on the back surface, which corresponds to the prism reference point. The position of the point (P3', P3", P3"') on the back surface, which corresponds to the prism reference point is defined as an origin, the horizontal direction of the lens is defined as an x axis, and the vertical direction of the lens is defined as a y axis.

Figure 14B:
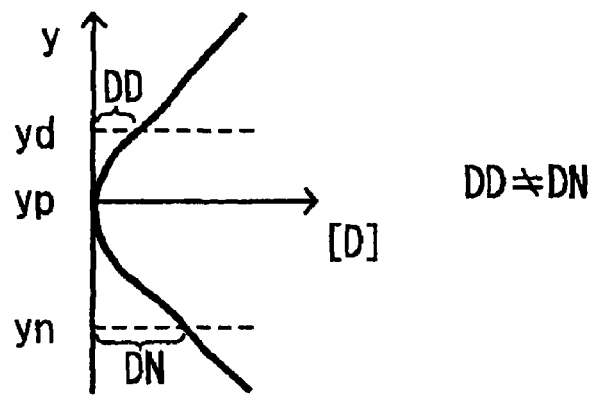
Figure 16B:
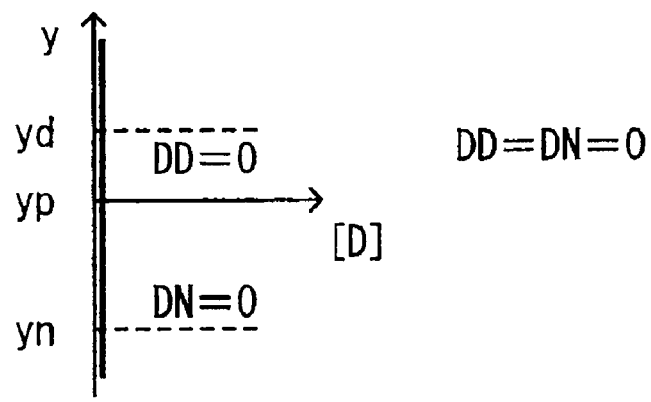

Furthermore, FIG. 14B is a diagram illustrating variations of the surface power in the y-axis direction of the lens back surface on the y-z plane of the aforementioned conventional aspherically designed one-side progressive-addition lens 20. FIG. 16B is a diagram illustrating variations of the surface power in the y-axis direction of the lens back surface on the y-z plane of the aforementioned conventional spherically designed one-side progressive-addition lens 30.

Here, in each of FIG. 14B and FIG. 16B and FIGS. 2, 3, 4 which will be described later, the position on the y-axis direction of the point (P3', P3", P3"') on the back surface, which corresponds to the prism reference point, is referred to as "yp". A distance in the y-axis direction from the position of the point (P3', P3", P3"') on the back surface, which corresponds to the prism reference point, to the position of the point (P1', P1", P1"') on the back surface, which corresponds to the distance reference point, is referred to as "yd". A distance in the y-axis direction from the position of the point (P3', P3", P3"') on the back surface, which corresponds to the prism reference point, to the position of the point (P2', P2", P2"') on the back surface, which corresponds to the near design reference point back surface, is referred to as "yn". In addition, the variation of the surface power is a value obtained by subtracting the surface power in the y-axis direction of the lens back surface at each point (P3', P3", P3") on the back surface, which corresponds to the prism reference point, from the surface power in the y-axis direction of the lens back surface at each position on the y axis.

In the case of the conventional spherically designed one-side progressive-addition lens 30 shown in FIG. 15, the surface astigmatism of the entire lens back surface is a constant value (−3.00 D) as shown in FIG. 16A. In addition, the variations of the surface power in the y-axis direction of the lens back surface is constant on the entire y axis as shown in FIG. 16B. In other words, the variation DD of the surface power in the y-axis direction of the back surface at the position yd on the y axis and the variation DN of the surface power in the y-axis direction of the back surface at the position yn on the y axis are "0 (zero)". Therefore, in this example, the measured distance power and the measured addition power are substantially equal to the prescribed powers.

In contrast, in the case of an example of the conventional aspherically designed one-side progressive-addition lens 20 shown in FIG. 13, the distribution of surface astigmatism on the lens back surface 22 occurs such that the absolute value of the surface astigmatism at any position of the lens back surface 22 becomes smaller as the position gets closer to the peripheral edge of the lens. In addition, as shown in FIG. 14B, the variation of the surface power in the y-axis direction of the lens back surface on the y-z plane is smallest at the point yp and increases in a vertically symmetrical manner as the position is upwardly or downwardly shifted away from the point yd on the y axis. It is found that the value of the variation DD of the surface power in the y-axis direction of the back surface at the point yd on the y axis is different from the value of the variation DN of the surface power in the y-axis direction of the back surface at the point yn.

Thus, in the conventional aspherically designed one-side progressive-addition lens, there is a fact that the variation of the surface power of the aspherically designed surface at the point P1" on the back surface (corresponding to the distance reference point) and the variation of the surface power of the aspherically designed surface at the point P2" on the back surface (corresponding to the near reference point) are different from each other. Such a fact is one of causes the measured power or measured distance power is different from the prescribed power. Therefore, in the case of a conventional aspherically designed progressive-addition lens, there is a need of additionally providing the lens with a check dioptric power as an indicated value.

In the present embodiment, on the other hand, the position of the reference point of the aspherically designed surface is shifted downward in the y-axis direction to reduce a difference between the surface power at a point on the aspherically designed surface, which corresponds to the distance reference point, and the surface power at a point on the aspherically designed surface, which corresponds to the near design reference point, or preferably to substantially equalize these surface powers.

The concept of a method for designing a lens according to an embodiment of the present invention will be described with reference to FIG. 2 to FIG. 4 with respect to the case of the present inventive aspherically designed one-sided progressive-addition lens as shown in FIG. 1. The aspherically designed one-side progressive-addition lens according to the embodiment of the present invention has a progressive surface as a lens front surface and an aspherically designed surface as a lens back surface.

Figure 2:
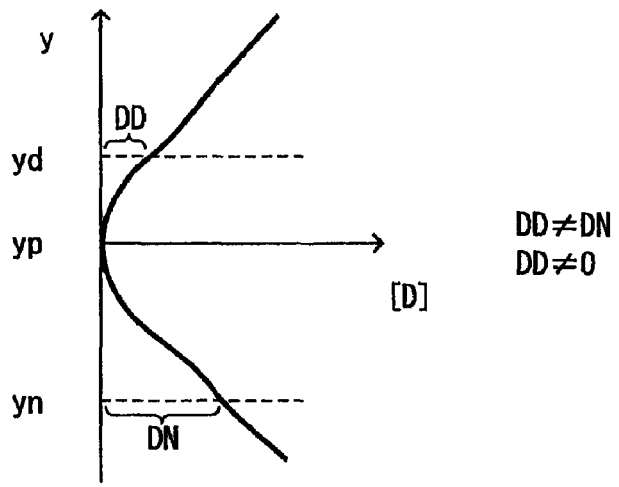
FIG. 2 is a graphical representation of a change in dioptric power of the back surface of a conventional progressive-addition lens having an aspherical or atoroidal surface as a back surface.
Figure 3:
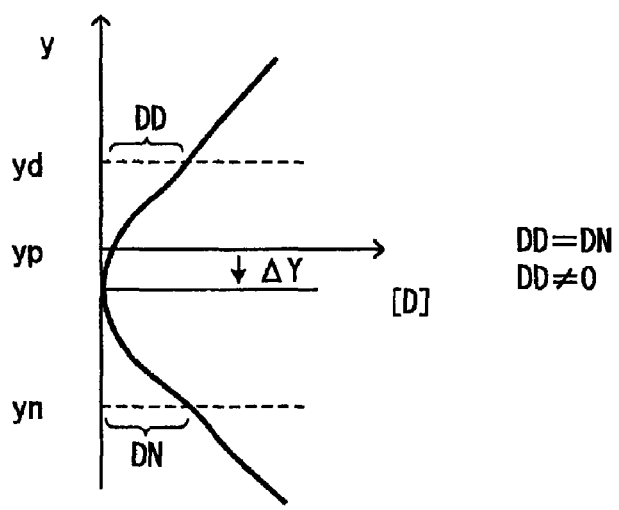
FIG. 3 is a diagram illustrating a change in dioptric power of the back surface of the progressive-addition lens shown in FIG. 2, where the back surface is moved downward along the y axis.
Figure 4:
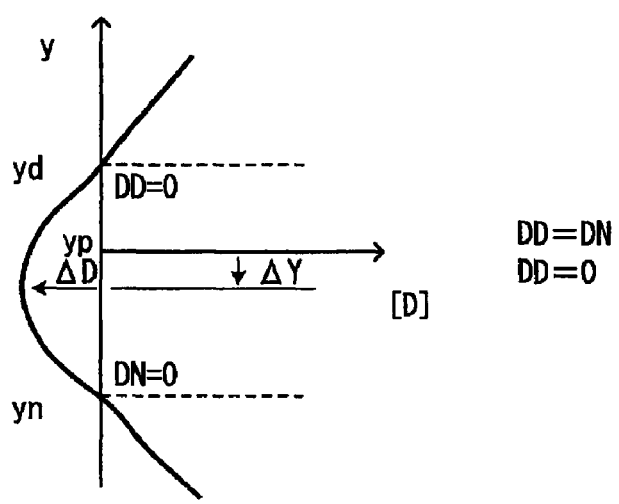
FIG. 4 is a diagram illustrating a change in dioptric power of the back surface of the progressive-addition lens shown in FIG. 3 after deforming the lens back surface such that the changed dioptric power portion of the back surface at a distance reference point is reduced from the lens back surface.

FIGS. 2 to 4 are diagrams sequentially illustrating variations of the surface power in the y-axis direction of the lens back surface on the y-z plane in the respective steps for designing the aspherically designed one-side progressive-addition lens 10 according to the present invention.

FIG. 2 illustrates a state before shifting the position of the reference point Ph of the aspherically designed surface downward by moving the lens back surface 2 downward relative to the lens front surface 1. In other words, it illustrates the variation of the surface power in the y-axis direction of the lens back surface on the y-z plane in a state that the reference point Ph of the aspherically designed surface of the lens back surface 2 is located on the normal line at the prism reference point P3 of the lens front surface 1 provided as a progressive surface. FIG. 2 illustrates the variation of the surface power in the same state as that of FIG. 14B, so that the description thereof will be omitted. In this way, in FIG. 2, the variation DD of the surface power in the y-axis direction of the back surface at the point yd is different from the variation DN of the surface power in the y-axis direction of the back surface at the point yn.

Next, FIG. 3 illustrates the variation of the surface power in the y-axis direction of the leans back surface on the y-z plane in a state after shifting the position of the reference point Ph of the aspherically designed surface downward by moving the lens back surface 2 downward relative to the lens front surface 1. In other words, FIG. 3 illustrates the state after parallel displacement of the lens back surface 2 in the y-axis direction until the variation DD of the surface power in the y-axis direction of the back surface at the point yd becomes equal to the variation DN of the surface power in the y-axis direction of the back surface at the point yn. In this example, DD=DN is attained when the lens back surface 2 is shifted ΔY. In the state after such a movement, the reference point Ph of the aspherically designed surface is located below the prism reference point P3 in the vertical direction in front view of the lens. In this way, the lens back surface 2 is moved relative to the lens front surface 1, so that the variation of the surface power in the y-axis direction of the lens back surface 2 is also shifted downward in the y-axis direction from the value at the time of the state shown in FIG. 2. It also results in DD=DN. In this case, the values of DD and DN are not zero (0).

Next, FIG. 4 illustrates the variation of the surface power in the y-axis direction of the lens back surface on the y-z plane in a state after changing the shape of the lens back surface 2. In other words, it shows a state after changing the shape of the lens back surface 2 so that the surface power of the entire lens back surface 2 is decreased only ΔD to make both DD and DN zero (0).

Thus, both DD and DN become zero (0). In other words, it becomes the state in which the surface dioptric power at the point P3' on the back surface, which corresponds to the prism reference point, before the movement of the back surface, is substantially coincident with the surface power of P1' on the back surface (corresponding to the distance reference point) and the surface power of the point P2' on the back surface (corresponding to the near reference point). Therefore, any influence of DD or DN at the time of measuring powers can be avoided, so that the measured values of distant power and addition power can be coincident with the prescribed powers.

In the above description, prism power, thickness of the lens center, and the like have not been considered. Therefore, a method for designing a lens with consideration of such factors will be now described with reference to FIG. 5A to FIG. 5C. In this case, like the above description, the description will be made with respect to the case of the aspherically designed one-side progressive-addition lens 10 having a progressive surface as the front surface 1 and an aspherically designed surface as the lens back surface 2 and in which the prism power is 0.00 ⌃.

Figure 5A:
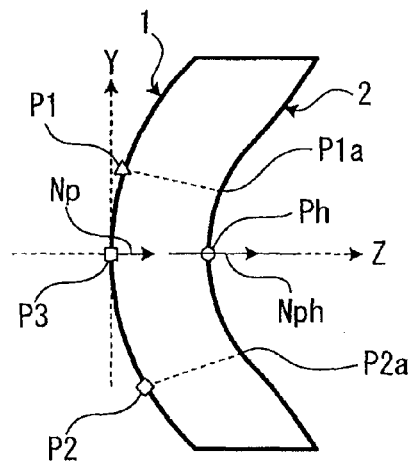
FIG. 5A to FIG. 5C illustrate correction steps in consideration of prism power.
Figure 5B:
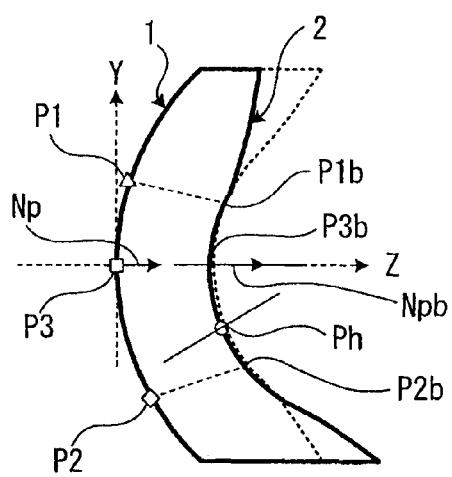
Figure 5C:
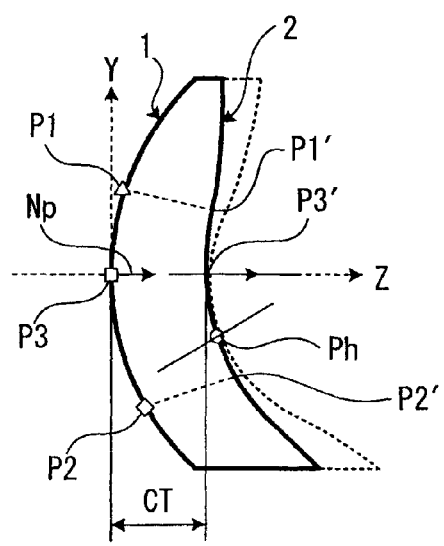

FIG. 5 is a diagram illustrating each step for designing the aspherically designed one-side progressive-addition lens 10 of the present embodiment, where the cross-sectional views of the lens 10 in the Y-Z plane are sequentially illustrated. In FIG. 5, components corresponding to those of FIG. 1 are provided with the same reference numerals as those of FIG. 1 to avoid overlapping description. Points on the lens back surface 2, which correspond to the distance reference point P1 and the near design reference point P2 in the state of FIG. 5A are referred to as P1$a$ and P2$a$, respectively. Points on the lens back surface 2, which correspond to the distance reference point P1, the near design reference point P2, and the prism reference point P3 in the state of FIG. 5B are referred to as P1$b$, P2$b$, and P3$b$, respectively. Also, points on the lens back surface 2, which correspond to the distance reference point P1, the near design reference point P2, and the prism reference point P3 in the state of FIG. 5C are referred to as P1', P2', and P3', respectively, in that order.

Here, the corresponding point on the lens back surface 2 is located at an intersection between a normal line at each of the points (P1, P2, P3) on the lens front surface 1 and the lens back surface 2. The corresponding points (P1$a$, P2$a$, P1$b$, P2$b$, P3$b$, P1', P2', P3') may be an intersection between the normal line of the lens back surface 2, which passes through each point (P1, P2, P3) and the lens back surface 2. Alternatively, it may be located at an intersection between a line parallel to the z axis, which passes through each point (P1, P2, P3), and the lens back surface 2.

FIG. 5A illustrates, like FIG. 2, a state before moving downward the lens back surface 2 provided as an aspherically designed surface relative to the lens front surface 1 provided as a progressive surface. In this state, the reference point Ph of the aspherically designed surface is located on the normal line passing through the prism reference point P3 of the lens front surface 1. In addition, so that the value of the center thickness of the lens 10 becomes a predetermined value, the lens back surface 2 is arranged at some interval relative to the lens front surface 1. In this example, the prism power is set to zero (0). Thus, the normal line direction Np of the lens front surface at the prism reference point P3 is coincident with the normal line direction Nph of the lens back surface 2 at the reference point Ph of the aspherically designed surface. In the case of designing a lens having a prism power, the lens back surface is inclined to obtain the prism power.

Next, the lens back surface 2 is shifted downward relative to the lens front surface 1. However, as described above with reference to FIG. 3, the back surface 2 is moved downward while the direction thereof is changed so that the difference between the surface power at the point P1' on the back surface (corresponding to the distance reference point) and the surface power at the point P2' on the back surface (corresponding to the near design reference point) can be within a predetermined range, or preferably both points can be substantially coincident with each other, and the prism power follows a design value. At this time, it is desirable that the center thickness of the lens becomes a predetermined value. The state after the movement is shown in FIG. 5B. In the example shown in FIG. 5B, to set the prism power to zero (0), the normal line direction Npb of the point P3$b$ on the lens back surface corresponding to the prism reference point P3 is coincident with the normal line of the lens front surface at the prism reference point P3. In addition, the reference point Ph of the aspherically designed surface is located below the prism reference point P3 or the corresponding point P1b of the back surface in the Y-axis direction on the Y-Z plane and above the near design reference point P2 or the corresponding point P2b on the back surface in the Y-axis direction. In addition, the normal line direction on the lens back surface at the reference point Ph of the aspherically designed surface is inclined downwardly on the Y-Z plane, on the side toward the lens front surface. In addition, in FIG. 5B, and in FIG. 5C which will be described later, the previous state of the lens back surface 2 is represented by a dashed line.

Note that with respect to the position to which the lens back surface 2 is moved downward relative to the lens front surface 1, by moving the lens back surface 2 such that the reference point Ph of the aspherically designed surface is moved to a substantially middle position in the Y-axis direction between the distance reference point P1 and the near reference point P2 or to a substantially middle position of the respective points P1a, P2a in the Y-axis direction, calculation can be simplified.

Next, in the state of FIG. 5B, the distance power for the case of assuming that the distance power is measured using a lens meter based on a method described in the above-described JIS is obtained by calculation. Then, the shape of the lens back surface 2 is deformed such that an error difference between the calculated distance power and the prescribed power is removed from the whole lens back surface. Then, after the deformation, when the prism power does not correspond to the design value, the direction of the back surface 2 is further changed so that the prism power coincides with the design value or falls within an allowable tolerance thereof. In addition, when the center thickness of the lens 10 (in general, the thickness of the lens 10 at the prism reference point P3) is not coincident with a predetermined value, the back surface 2 is shifted in parallel in the Z-axis direction so that the center thickness of the lens 10 coincides with a prescribed value or falls within an allowable tolerance thereof. This state is illustrated in FIG. 5C. In general, the deviance of the prism power and the deviance of the center thickness after deforming the back surface 2 are negligible. Thus, the subsequent processes of changing the direction of the back surface 2 and of moving the back surface 2 in parallel may be carried out only when the prism power and the center thickness are out of allowable tolerances.

With the process as illustrated in FIG. 5A to FIG. 5C, the shape, direction, and position of the lens back surface 2 provided as an aspherically designed surface for the lens front surface 1 provided as a progressive surface selected on the basis of a prescribed dioptric power are calculated, thereby determining the final completed shape of the progressive-addition lens. In the aspherically designed one-side progressive-addition lens 10, which has been designed as described above, there is no difference between the surface power at the point P1' on the back surface (corresponding to the distance reference point) and the surface power at the point P2' on the back surface (corresponding to the near design reference point) or the difference between them can be fallen within a predetermined range. In addition, the prism power can be set to a design value or can be fallen within an allowable tolerance thereof, and the center thickness of the lens can be set to a predetermined value or can be within an allowable tolerance thereof.

Note that in FIG. 5A to FIG. 5C described above, the shape and direction of the lens and changes thereof are overdrawn to facilitate understanding.

Figure 12:
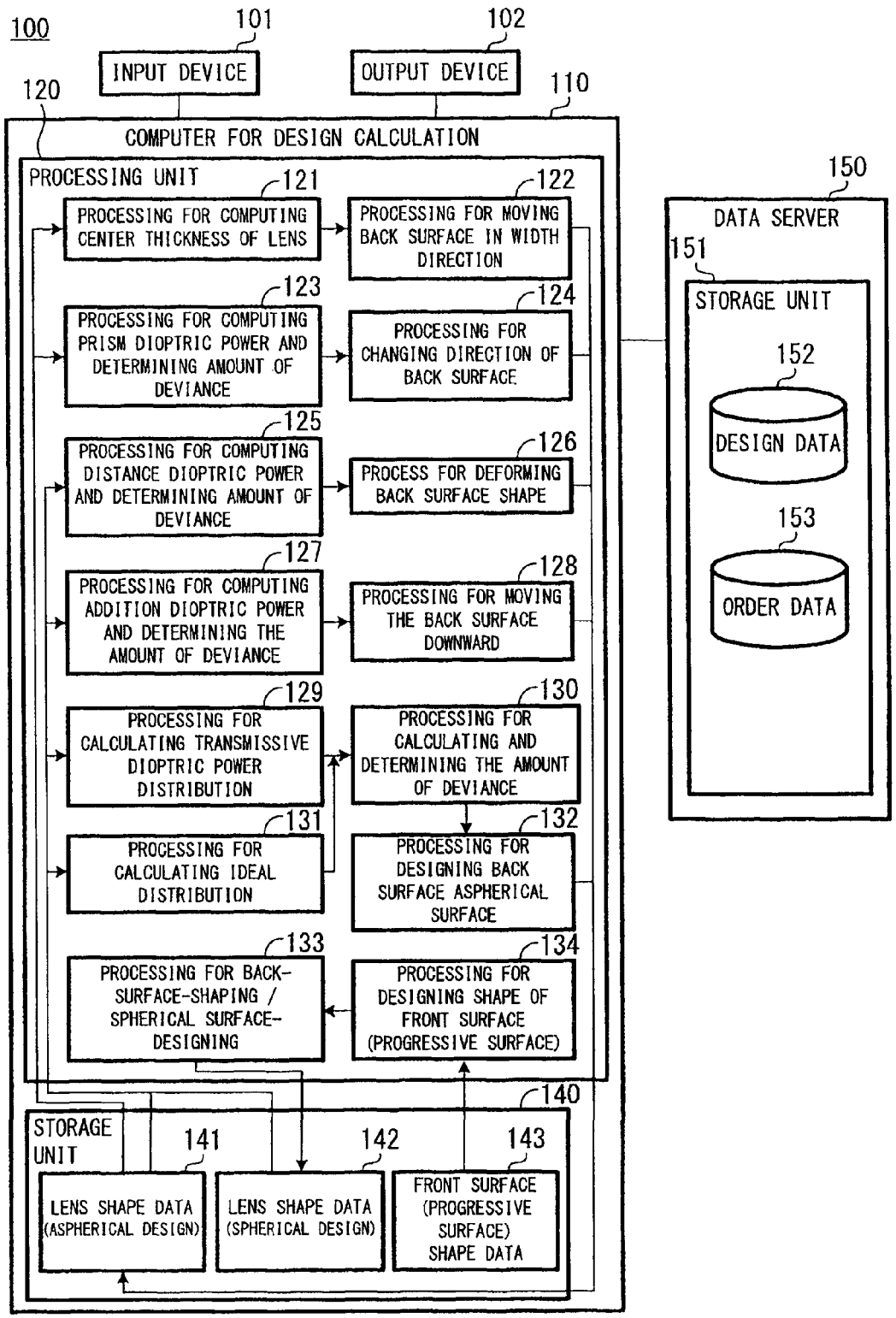
FIG. 12 is a block diagram illustrating the configuration of an apparatus for preparing shape data of a progressive-addition lens according to an embodiment of the present invention.

Referring now to FIG. 12, an example of an apparatus for preparing shape data of the inventive progressive-addition lens will be described.

Figure 9:
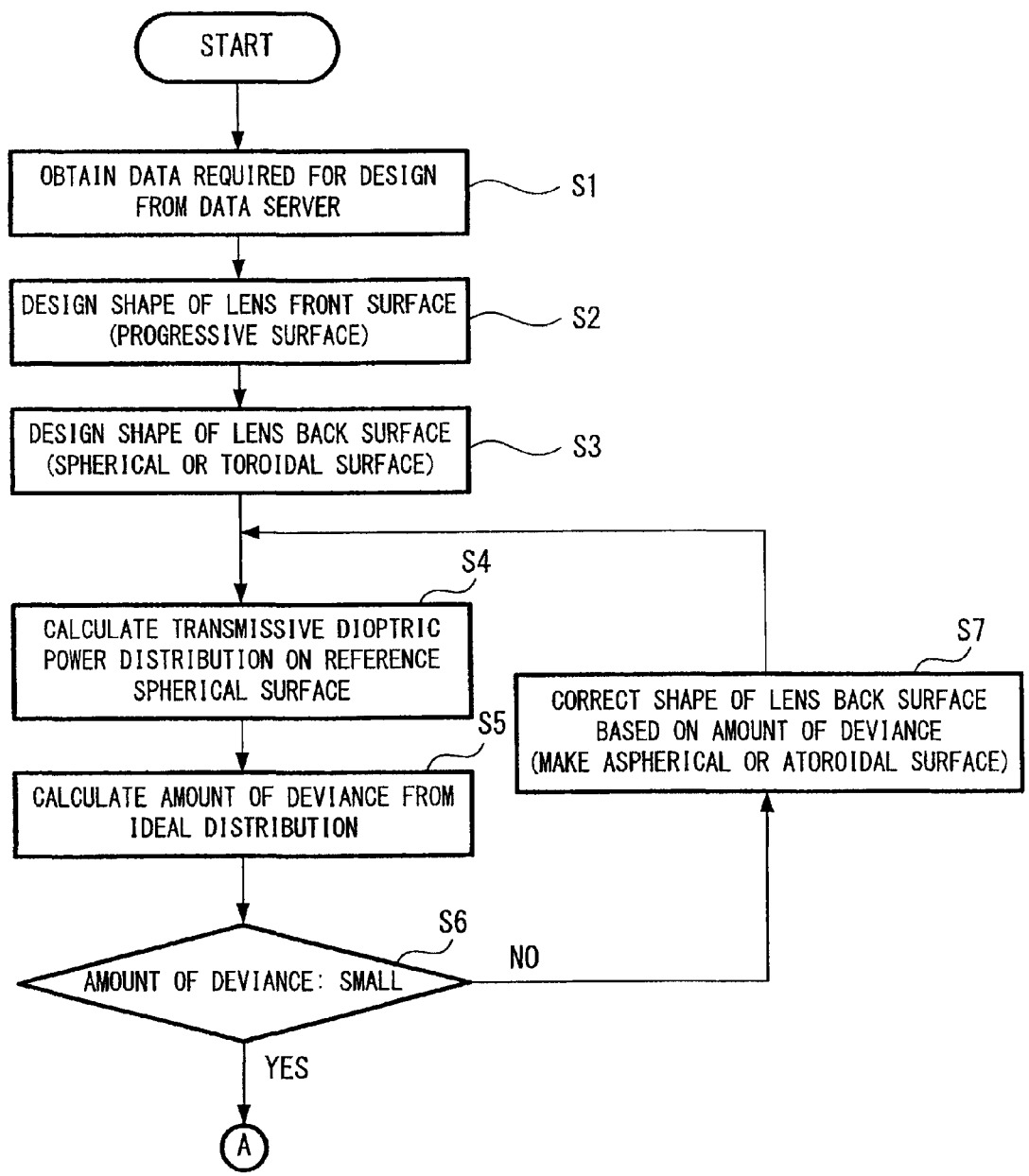
FIG. 9 is a part of a flowchart illustrating steps of a process for preparing shape data of a progressive-addition lens according to an embodiment of the present invention.

FIG. 12 is a block diagram corresponding to flowcharts shown in FIG. 9 to FIG. 11 which will be described later, where blocks represent the respective functions installed in a computer for design calculation. As shown in FIG. 12, an apparatus 100 for preparing shape data of a progressive-addition lens in accordance with the embodiment of the present invention includes a design-calculation computer 110 connected to an input device 101 and an output device 102; and a data server 150.

As shown in FIG. 12, the data server 150 includes a storage unit 151. This storage unit 151 includes an order database 153 in which order data from users are accumulated and a design database 152 that stores data of lens shapes designed by the design calculation computer 110. The storage unit 151 may store various kinds of data required for carrying out calculation processing in the design calculation computer 110.

In contrast, the design calculation computer 110 is responsible for taking in necessary data from the data server 150 and designing a progressive-addition lens on the basis of an installed program. The design calculation computer 110 includes a processing unit 120 and a storage unit 140. The processing unit 120 realizes respective functions when the program is run.

In addition, the storage unit 140 stores data required for lens designing (e.g., shape data 143 for lens front surface (progressive surface) and lens shape data processed by the processing unit 120 (e.g., lens shape data 142 for designing a spherical surface and lens shape data 141 for designing an aspherical surface). The details of each function of the processing unit will be described later. Note that various functions and functional units of the apparatus 100 for preparing lens shape data may be appropriately unified or distributed.

Referring now to the flowchart represented in FIG. 9 to FIG. 11 and the block diagram represented in FIG. 12, next, an exemplary method for preparing shape data of a progressive-addition lens according to an embodiment of the present invention will be described.

First, data required for designing the shape of a progressive-addition lens is acquired from the storage unit 151 of the data server (step S1).

Here, the data necessary for designing the lens include prescription data, spectacle lens information, layout information, and the like. The prescription data include spherical surface power, cylindrical power, cylindrical axis, prescription prism power, prism base setting, addition power, and the like. The spectacle lens information includes information about lens materials, refractive index, varieties of optical design for the front and back surfaces of the lens, the center thickness of the lens, the outer diameter of the uncut lens, prism thinning, and the like. The layout information includes interpupillary distance, near interpupillary distance, eye point position, progressive belt length, and the like. These data are stored as order data 153 in the storage unit 151 of the data server 150 on the basis of the contents of orders from customers in advance.

Next, based on the data acquired in step S1, the shape of the lens front surface 1 is designed (step S2, front-shape design processing 134). This design processing may be carried out each time, or alternatively, shape data prepared in advance may be used. For example, progressive-surface shape data for prescribed dioptric power may be prepared for every optical design form in advance and then stored as progressive-surface shape data 143 in the storage unit 140 and the shape data of an appropriate progressive surface may be selected depending on the optical design form and the prescribed dioptric power in the contents of an order.

Subsequently, designing of an aspherical surface on the back surface of the lens or the surface opposite to the progressive surface is carried out (steps S3 to S7).

First, the shape data for the lens back surface 2 provided as a spherically designed surface (spherical surface or toroidal surface) corresponding to a desired prescribed power is designed, and the lens shape data is computed by arranging the lens back surface 2 based on the designed shape data in a predetermined position relative to the lens front surface 1 (step S3, back-surface-shaping/spherical surface-designing processing 133). With respect to the position of the back surface 2 relative to the lens front surface 1, when the spherically designed surface is a toroidal surface, the direction and the interval of the back surface 2 relative to the lens front surface 1 are set such that the reference point of the toroidal surface on the back surface is located on the normal line on the lens front surface 1 at the prism reference point P3 and in addition, predetermined center thickness and prism power based on the content of the order can be obtained. When the spherically designed surface is a spherical surface, the direction of a line connecting the center of a sphere including the spherically designed surface and the point on the back surface corresponding to the prism reference point is set and in addition, the interval of the lens back surface 2 relative to the lens front surface 1 is set so that the predetermined center thickness and prism power based on the content of the order can be obtained.

The lens shape data computed in this step is data for a spherically designed one-side progressive-addition lens. By the way, the shape data of the spherically designed surface may be previously formed and stored in the storage unit 140 and may be chosen in response to the contents of an order and prescription. The storage unit 140 stores the lens shape data calculated in this step S3 as lens shape data of a spherically designed one-side progressive-addition lens (hereinafter, also referred to as lens shape data for spherical surface design) 142.

Next, to reduce various kinds of aberration of the spherically designed one-side progressive-addition lens designed in the step S3, the spherically designed surface is modified to make an aspherical surface or an atoroidal surface. This processing is a looped sequence of processing from step S4 to step S7.

First, transmissive dioptric power distribution on a reference spherical surface is calculated with respect to the lens shape data for spherical surface design defined in step S3 (step S4, processing for calculating transmissive dioptric power distribution 129).

Then, the amount of deviance from the ideal distribution (processing for calculating ideal distribution 131) of the transmissive dioptric power previously calculated in response to the contents of an order is calculated for calculated transmissive dioptric power (step S5, processing for calculating and determining the amount of deviance 130).

Furthermore, it is judged whether the amount of deviance is within a predetermined range (step S6, processing for calculating and determining the amount of deviance 130). If the amount of deviance is out of the predetermined range, the shape of the lens back surface 2 is deformed and corrected so that the amount of deviance can be decreased on the basis of the amount of the deviance of the dioptric power (step S7, processing for designing back surface aspherical surface 132). The determination of whether the amount of deviance is within a predetermined range may be performed by measuring the amount of deviance at each of distributed points and determining whether the total value thereof is within a predetermined value. The shape of the lens back surface corrected by the step S7 is an aspherically designed surface. Then, depending on the shape of a lens with a spherical surface after the correction, the process returns to the step S4 to calculate the distribution of transmissive dioptric power on the spherical surface again.

When the amount of deviance is placed within the predetermined range by repeating these steps S4 to S7 ("YES" in step S6), the shape data is stored in the storage unit 140 as lens shape data 141 of the aspherically designed one-side progressive-addition lens (hereinafter, also referred to as lens shape data for aspherical surface design). Then, the process proceeds to the next step sequence (A) shown in FIG. 10.

Figure 10:
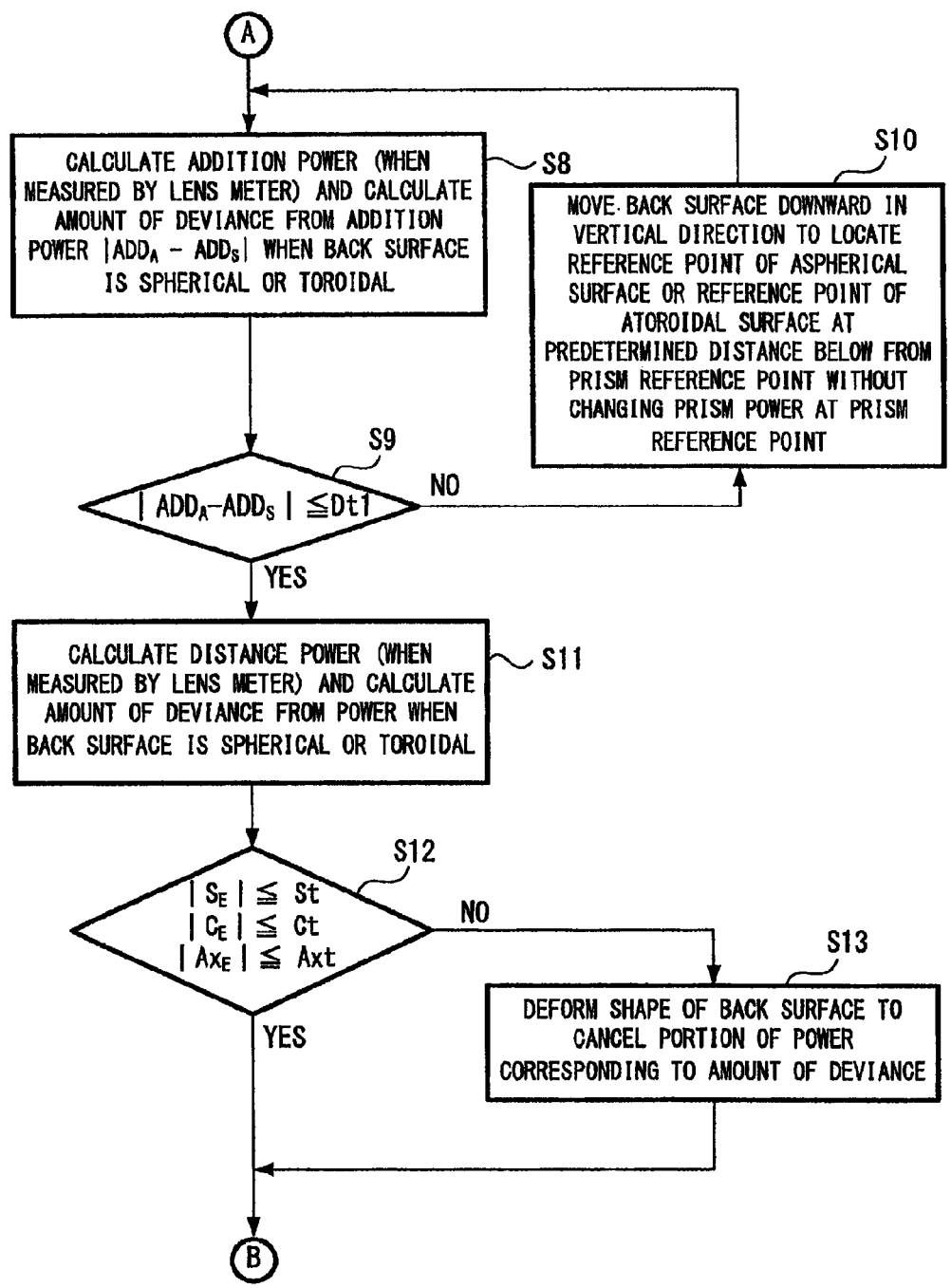
FIG. 10 is another part of the flowchart illustrating steps of the process for preparing shape data of a progressive-addition lens according to the embodiment of the present invention.

As shown in FIG. 10, first, addition power is computed under assumption that both the computed lens shape data for spherical surface design 142 and the computed lens shape data for aspherical surface design 141 are those obtained by placing the distance reference point P1 and the near design reference point P2 on the front surface 1 of a lens on a lens meter according to a method for measuring addition power defined by JIS. The amount of deviance of the addition power $ADD_A$ for the lens shape data for aspherical surface design 141 to the addition power $ADD_S$ for the lens shape data for spherical surface design 142 is computed ($|ADD_A-ADD_S|$) (processing for computing addition dioptric power and determining the amount of deviance 127, step S8).

Subsequently, an appropriate threshold Dt1 (e.g., a small value, 0 or 0.01) is defined and it is then determined whether the amount of deviance, $|ADD_A-ADD_S|$, of the addition power is equal to the threshold Dt1 or less. In other words, it is determined that whether $|ADD_A-ADD_S|$ satisfies the following equation (processing for computing addition dioptric power and determining the amount of deviance 127, step S9):

$$|ADD_A-ADD_S| \leq Dt1$$

(if Dt1=0, then $|ADD_A-ADD_S|=0$)

In the step S9, if it is determined that $|ADD_A-ADD_S|$ is larger than Dt1 ($|ADD_A-ADD_S|>Dt1$) ("NO" in the step S9), the lens back surface 2 is then moved downward a predetermined distance in the vertical direction (downward in the Y-axis direction) while the prism power is kept constant to allow the reference point Ph of the aspherically designed surface to be moved downward relative to the lens front surface 1 (processing for moving the back surface downward 128, step S10).

Subsequently, the storage unit 140 stores the lens shape after the movement as new lens shape data for aspherical surface design 141. After that, depending on the lens shape data for aspherical surface design 141 after the movement, the amount of deviance of the addition power is computed again, and the steps S8 to S10 are repeated until the amount of deviance is equal to the threshold Dt1 or less.

If the amount of deviance of the addition power is finally set to the threshold Dt1 or less by the steps S8 to S10 ("YES" in step S9), then with respect to resulting lens shape data for aspherical surface design 141 and the aforementioned lens shape data for spherical surface design 142, distance power is measured for the assumed case that the measurement has been made by placing the lens back surface 2 on a lens meter so that the optical axis of the lens meter overlaps the distance reference point according to a method for measuring distance power defined by JIS, and the amount of deviation of distance power of the lens shape data for aspherical surface design 141 from that of the lens shape data for spherical surface design 142 is calculated (processing for computing distance dioptric power and determining amount of deviance 125, step S11).

Here, specifically, the amount of deviance of distance power (the amount of deviance $S_E$ of spherical surface power, the amount of deviance $C_E$ of astigmatic power, the amount of deviance $Ax_E$ of cylinder axis) can be calculated from the distance power of the lens shape for spherical surface design (spherical surface power $S_S$, astigmatic surface power $C_S$, cylinder axis $Ax_S$) and the distance power of the lens shape for aspherical surface design (spherical surface power $S_A$, astigmatic surface power $C_A$, cylinder axis $Ax_A$).

Furthermore, an appropriate threshold (threshold St of spherical surface power, threshold Ct of astigmatic power, threshold Axt of cylinder axis) is set. Then, it is determined whether the amount of deviance of the distance power is equal to the threshold or less. In other words, it is determined whether any of the following equations is satisfied (processing for calculating distance dioptric power and determining amount of deviance 125, step S12):

$$|S_E| \leqq St$$

$$|C_E| \leqq Ct$$

$$|Ax_E| \leqq Axt$$

Here, when the amount of deviance exceeds the threshold ("NO" in step S12), the shape of the lens back surface is deformed to reduce the amount of deviance from the entire lens (process for deforming back surface shape 126, step S13). The storage unit 140 stores the resulting lens shape as new lens shape data for spherical surface design 141. Then, the process proceeds to the next step sequence (B) shown in FIG. 11. In addition, the process also proceeds to the next step sequence (B) when the step S12 determines that the amount of deviance is equal to the threshold or less.

Figure 11:
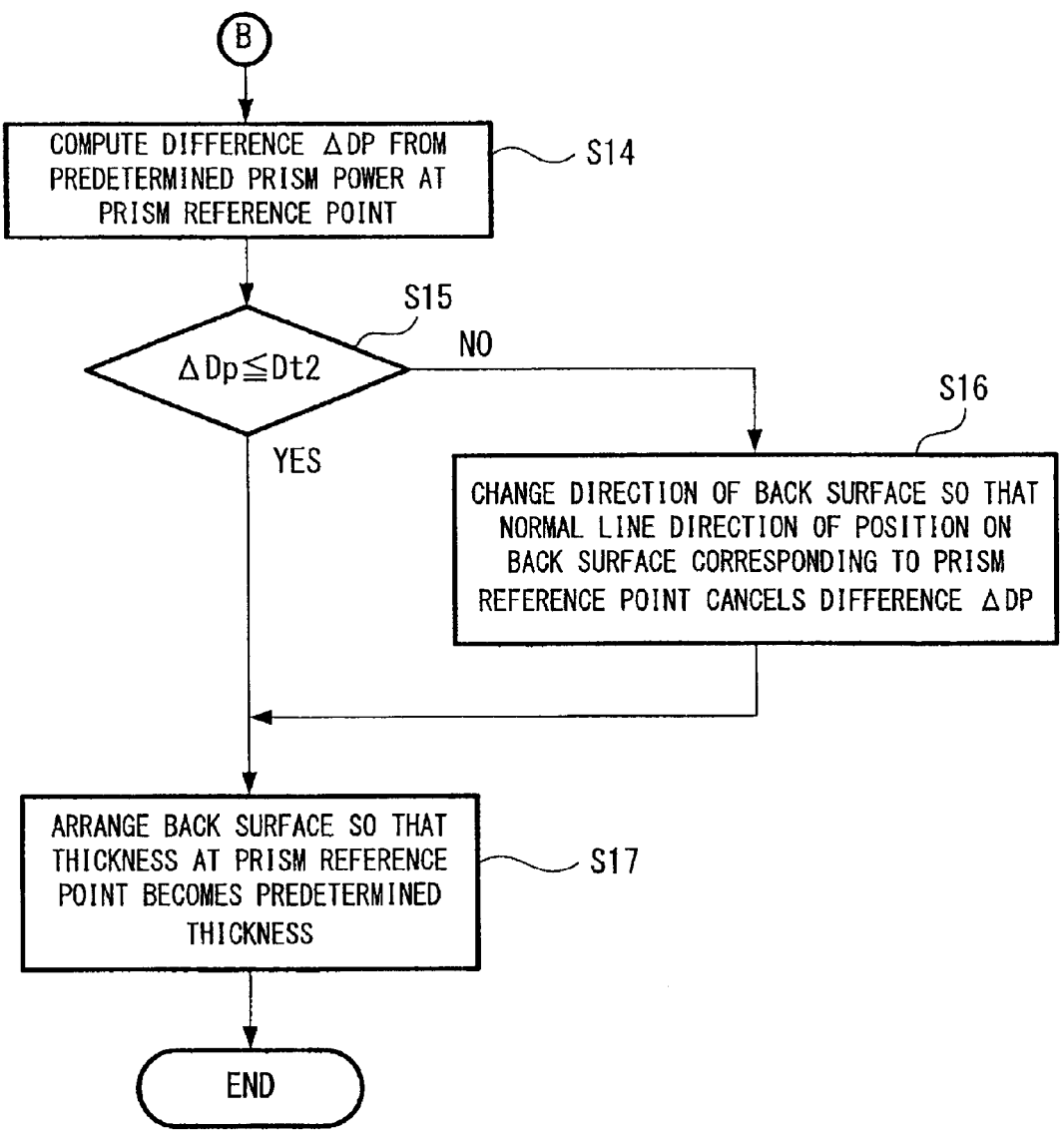
FIG. 11 is another part of the flowchart illustrating steps of the process for preparing shape data of a progressive-addition lens according to the embodiment of the present invention.

Next, as shown in FIG. 11, with respect to the resulting lens shape data for aspherical surface design 141 obtained in the previous step, prism power is computed for the assumed case that the measurement has been made by placing the lens back surface 2 on a lens meter so that the optical axis of the lens meter overlaps the prism reference point P3 according to a method for measuring distance power defined by JIS, and a difference ΔDp between the resulting prism power and a predetermined objective prism power is computed (processing for computing prism dioptric power and determining amount of deviance 123, step S14). Then, it is determined whether the difference ΔDp is equal to a threshold Dt2 or less (processing for computing prism dioptric power and determining amount of deviance 123, step S15). Here, if the difference ΔDp is not equal to the threshold or less ("NO" in the step S15), then the direction of the lens back surface is changed so that the normal line direction at the position corresponding to the prism reference point of the lens back surface is changed (processing for changing direction of back surface 124, step S16) to make the prism power the above-described predetermined one. Then, the process proceeds to the step S17.

In the step S15, if it is determined that the difference ΔDp is equal to the predetermined threshold Dt2 or less ("YES" in the step S15), then the process proceeds to the next step of S17. Here, after the step S15 or the step S16, the storage unit 140 stores the resulting lens shape as lens shape data for aspherical surface design 141.

Subsequently, with respect to the lens shape data for aspherical surface design 141 obtained in the previous step, the center thickness of the lens (the thickness of the geometrical center of the lens or the thickness of the lens at the prism reference point) is computed (processing for computing center thickness of lens 121). If it is not within a predetermined allowable tolerance, the lens back surface 2 is moved in the direction parallel to the normal line at the prism reference point of the lens front surface 1 (processing for moving back surface in width direction 122, step S17). The storage unit 140 stores the resulting lens shape data as new lens shape data for aspherical surface design 141. In addition, the lens shape data for aspherical surface design 141 is sent to the data server 150 and stored as design data 152 in the storage unit 151. Consequently, the process for forming the data of a progressive-addition lens is completed.

The progressive-addition lens according to the embodiment of the present invention can be produced based on the lens shape data 141 (design data 152) determined by the above-described steps of the arithmetic process.

The progressive-addition lens designed as described above is provided with an aspherical or atoroidal surface on the side opposite to the progressive surface to enhance the power of vision on the lens periphery side, and the amount of deviance of each of the distance power and the addition power from the prescribed power when measured with a lens meter after the production of the lens can be suppressed within a predetermined range or to the prescribed power. Therefore, the values of the distance power and addition power can be surely placed in their respective allowable tolerances defined by JIS.

The apparatus for preparing shape data of a progressive-addition lens of the present invention has been described by explaining what kinds of devices are required for realizing the functions of the processing unit 120 of the computer. All of the effects or functions of these devices can be realized by a program installed in the computer. Thus, the principal portion of the above-described apparatus corresponds to the functions of a computer program. Thus, according to the present invention, the above-described functions can be realized by a computer program for designing shape data of a progressive-addition lens comprising a progressive surface on one side and an aspherical or atoroidal surface on the other side.

The present invention is not limited to any configuration described in the aforementioned embodiments and may include various kinds of modified examples and applied examples within the scope of the invention without departing from the gist of the invention as described in claims.

Next, an example of the progressive-addition lens where the shape thereof has been designed as described above will be described in comparison with a comparative example on which the present invention is not applied.

First, lenses of the comparative examples will be described.

A first comparative example is a conventional spherically designed one-side progressive-addition lens. The front surface of the lens is provided as a progressive surface and the back surface thereof is provided as a spherical surface. The prescribed powers of the lens of Comparative Example 1 are as follows: distance power; spherical surface power of 6.00 D and astigmatic power of 0.00 D, addition power; 2.00 D, prism power; 0.00Δ. In addition, the curve of the lens front surface is 7.00 D, and the curve of the lens back surface is 4.19 D. Furthermore, the refractive index of the lens material is 1.60, and the center thickness of the lens is 6 mm.

Figure 17A:
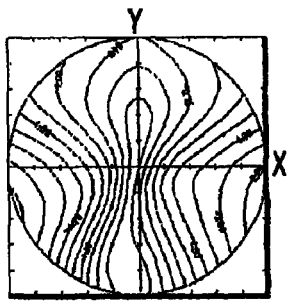
FIG. 17A to FIG. 17C represent the distributions of surface astigmatism, surface mean dioptric power and height of the progressive surface.
Figure 17B:
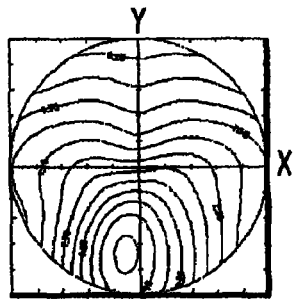
Figure 17C:
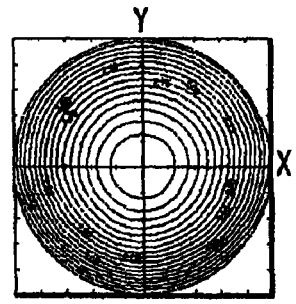
Figure 17D:
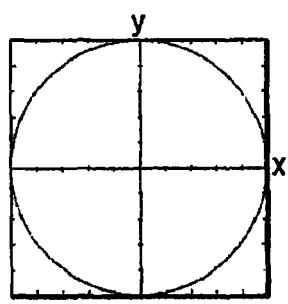
FIG. 17D to FIG. 17F illustrate the distributions of surface astigmatism, surface mean dioptric power and height of the spherical surface.
Figure 17E:
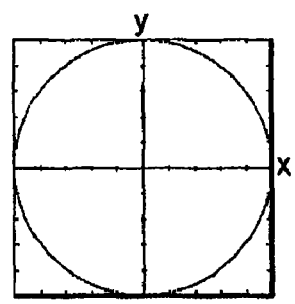
Figure 17F:
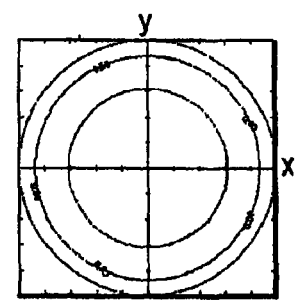

FIGS. 17A to 17C illustrate distributions of surface astigmatism, surface mean dioptric power, and height of the lens front surface (progressive surface) of the lens of Comparative Example 1, respectively. FIGS. 17D to 17F illustrate distributions of surface astigmatism, surface mean dioptric power, and height of the lens back surface (spherical surface) of the lens of Comparative Example 1, respectively.

Figure 17G:
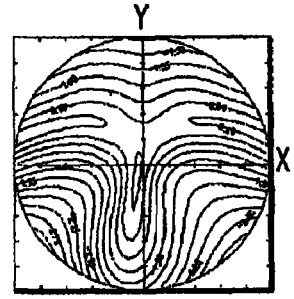
FIGS. 17G and 17H represent astigmatism and power error in transmissive dioptric power on the reference spherical surface.
Figure 17H:
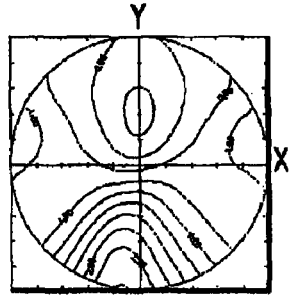

FIG. 17G and FIG. 17H illustrate astigmatism and power error (mean dioptric power of errors against the prescribed power of the distance portion) as the transmissive dioptric power of the reference spherical surface.

A second comparative example is a conventional spherically designed one-side progressive-addition lens, having a progressive surface as a lens front surface and a toroidal surface as a lens back surface. The prescribed powers of the lens of Comparative Example 2 are as follows: distance power; spherical surface power of 6.00 D, astigmatic power of −3.00 D, and cylinder axis of 0 degree, addition power; 2.00 D, prism power; 0.00$\Delta$. In addition, the curve of the front surface is 7.00 D, and the curve of the lens back surface is 4.19 D at maximum and 1.19 D at minimum. In addition, the refractive index of the lens material is 1.60, and the center thickness of the lens is 6 mm.

Figure 18A:
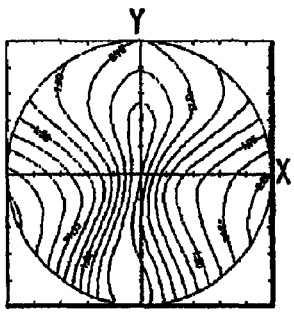
FIG. 18A to FIG. 18C represent distributions of surface astigmatism, surface mean dioptric power, and height of the progressive surface.
Figure 18B:
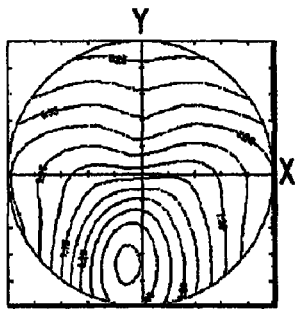
Figure 18C:
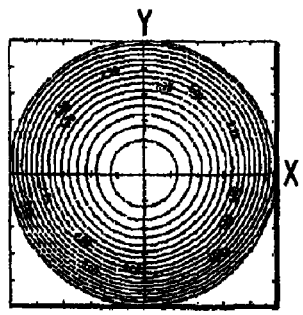
Figure 18D:
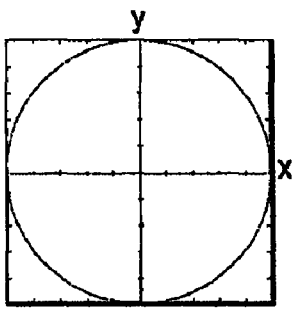
FIG. 18D to FIG. 18F illustrate distributions of surface astigmatism, surface mean dioptric power, and height of the toroidal surface.
Figure 18E:
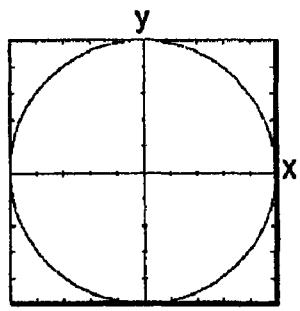
Figure 18F:
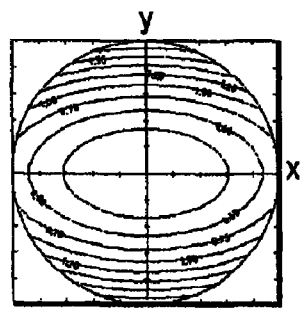
Figure 18G:
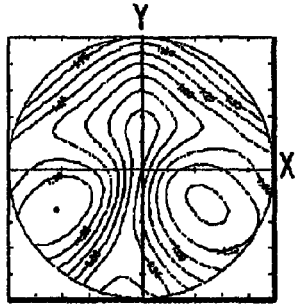
FIG. 18G and FIG. 18H represent astigmatism and power error in transmissive dioptric power on the reference spherical surface.
Figure 18H:
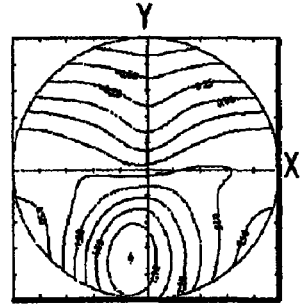

FIGS. 18A to 18C illustrate distributions of surface astigmatism, surface mean dioptric power, and height of the lens front surface (progressive surface) of the lens of Comparative Example 1, respectively. FIGS. 18D to 18F illustrate distributions of surface astigmatism, surface mean dioptric power, and height of the lens back surface (toroidal surface) of the lens of Comparative Example 1, respectively. FIG. 18G and FIG. 18H illustrate astigmatism and power error as the transmissive dioptric power of the reference spherical surface.

Next, exemplary lenses of the present invention will be described.

A first example is an aspherically designed one-side progressive-addition lens according to an embodiment of the present invention, having a progressive surface as a lens front surface and an aspherical surface as a lens back face. The prescribed powers of the lens of Example 1 are as follows: distance power; spherical surface power of 6.00 D and astigmatic power of 0.00 D, addition power; 2.00 D, prism power; 0.00$\Delta$. The curve of the lens front surface is 7.00 D and the curve of the lens back surface is 4.19 D. In addition, the refractive index of the lens material is 1.60, and the center thickness of the lens is 6 mm.

Figure 6A:
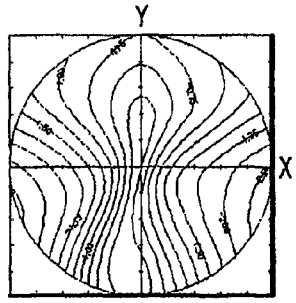
FIG. 6A to FIG. 6C represent distributions of surface astigmatism, surface mean dioptric power, and height of the progressive surface.
Figure 6B:
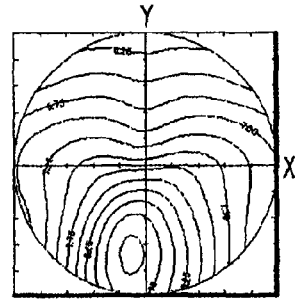
Figure 6C:
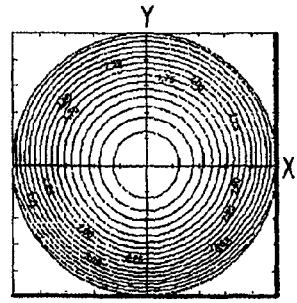
Figure 6D:
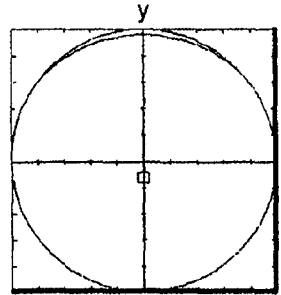
FIG. 6D to FIG. 6F illustrate distributions of surface astigmatism, surface mean dioptric power, and height of the aspherical surface.
Figure 6E:
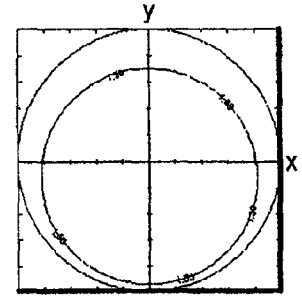
Figure 6F:
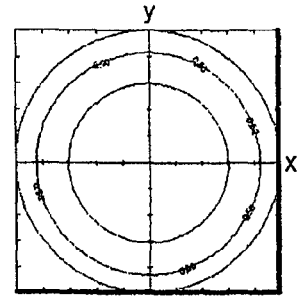
Figure 6G:
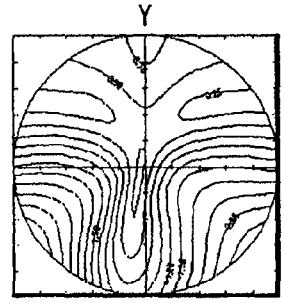
FIGS. 6G and 6H represent astigmatism and power error in transmissive dioptric power on the reference spherical surface.
Figure 6H:
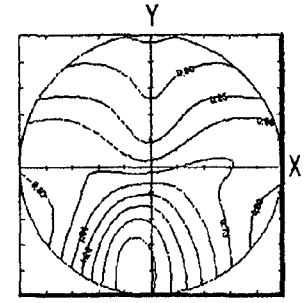

FIGS. 6A to 6C illustrate distributions of surface astigmatism, surface mean dioptric power, and height of the lens front surface (progressive surface) of the lens of Example 1, respectively. FIGS. 6D to 6F illustrate distributions of surface astigmatism, surface mean dioptric power, and height of the lens back surface (aspherical surface) of the lens of Example 1, respectively. FIG. 6G and FIG. 6H illustrate astigmatism and power error as the transmissive dioptric power of the reference spherical surface.

Example 2 is an aspherically designed one-side progressive-addition lens, having a progressive surface as a lens front surface and an atoroidal surface as a lens back surface. The prescribed powers of the lens of Example 2 are as follows: distance power; spherical surface power of 6.00 D, astigmatic power of −3.00 D, and cylindrical axis of 0 degree, addition power; 2.00 D, prism power; 0.00$\Delta$. In addition, the curve of the lens front surface is 7.00 D, and the curve of the lens back surface of 4.19 D at maximum and 1.19 D at minimum. Furthermore, the reflective index of the lens material is 1.60, and the center thickness of the lens is 6 mm.

Figure 7A:
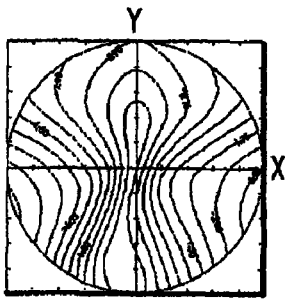
FIG. 7A to FIG. 7C represent distributions of surface astigmatism, surface mean dioptric power, and height of the progressive surface.
Figure 7B:
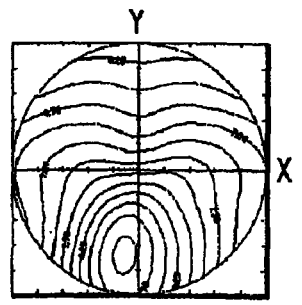
Figure 7C:
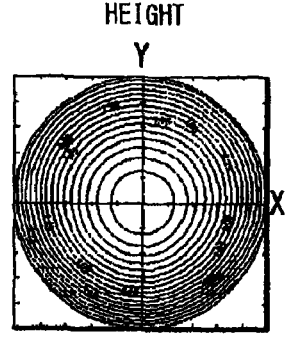
Figure 7D:
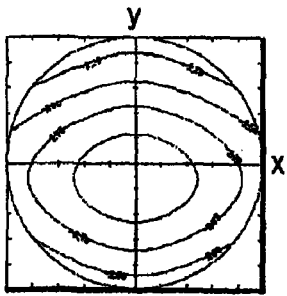
FIG. 7D to FIG. 7F illustrate distributions of surface astigmatism, surface mean dioptric power, and height of the atoroidal surface.
Figure 7E:
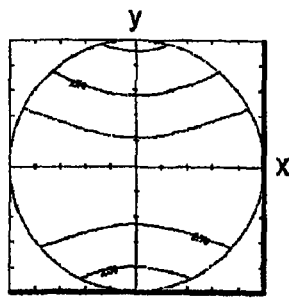
Figure 7F:
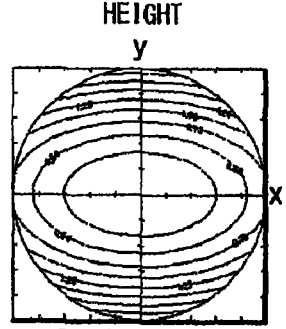
Figure 7G:
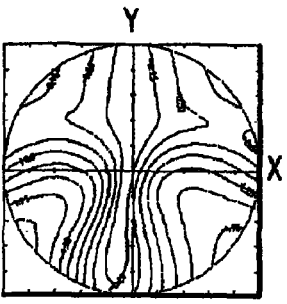
FIGS. 7G and 7H represent astigmatism and power error in transmissive dioptric power on the reference spherical surface.
Figure 7H:
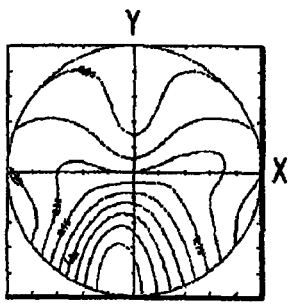

FIGS. 7A to 7C illustrate distributions of surface astigmatism, surface mean dioptric power, and height of the lens front surface (progressive surface) of the lens of Example 2, respectively. FIGS. 7D to 7F illustrate distributions of surface astigmatism, surface mean dioptric power, and height of the lens back surface (aspherical surface) of the lens of Example 2, respectively. FIG. 7G and FIG. 7H illustrate astigmatism and power error as the transmissive dioptric power of the reference spherical surface.

Here, in the coordinates represented in FIGS. 6A to 6C, 6G, and 6H, FIGS. 7A to 7C, 7G, and 7H, FIGS. 17A to 17C, 17G, and 17H, and FIGS. 18A to 18C, 18G and 18H, and also FIGS. 8A and 8B which will be described later, an origin corresponds to a prism reference point P3, an X axis passes the prism reference point P3 and extends in the direction perpendicular to the normal line of the lens front surface 1 at the prism reference point P3, and a Y axis extends in the direction perpendicular to the normal line. Also in the coordinates represented in FIGS. 6D to 6F, FIGS. 7D to 7F, FIGS. 17D to 17F, and FIGS. 18D to 18F, origins correspond to points P3', P3'', P3''' on the back surface corresponding to the prism reference point, an x axis passes the points P3', P3'', P3''' and extends in the direction perpendicular to the normal line of the lens back surface 2, 22, 32 at the points P3', P3'', P3''', and a y axis extends in the direction perpendicular to the normal line. Here, the "height" of the lens in each of FIG. 6C, FIG. 7C, FIG. 17C, and FIG. 18C means a height from the X-Y plane to the lens front surface. In addition, the "height" of the lens in each of FIG. 6F, FIG. 7F, FIG. 17F, and FIG. 18F means a height from X-Y plane to the lens back surface.

Furthermore, the shape of the lens front surface (progressive surface) of one of Comparative Examples 1 and 2 and Examples 1 and 2 is identical with that of the others.

The distance power and the addition power of each of the lenses of Comparative Examples 1 and 2 and Examples 1 and 2 were subject to a measurement with a lens meter based on JIS T7315. As a result, the comparative examples showed no substantial error in reference to the prescribed power. The errors from the prescribed powers of Example 1 were as follows: distance power; spherical surface power of −0.05 D and astigmatic power of −0.04 D, addition power; −0.03 D. In addition, the errors from the prescribed power of Example 2 were as follows: distance power; spherical surface power of 0.00 D, astigmatic power of 0.00 D, and cylinder axis of 0 degree, addition power; −0.03 D.

In this way, the distance power and the addition power of each of lenses of Examples 1 and 2 measured by a lens meter are within allowable tolerances defined by JIS T7315, respectively. Therefore, it is found that there is no need of additionally indicating check dioptric powers.

FIGS. 6A to 6C, FIGS. 17A to 17C, and FIGS. 18A to 18C illustrate the lens front surfaces (progressive surfaces) formed on the basis of the same design data. Thus, they have substantially the same distributions of surface astigmatism, surface mean dioptric power, and height. In addition, in each of FIGS. 17D and 17E and FIGS. 18D and 18E, the lens has a spherically designed surface showing substantially the constant values on the entire back surface area thereof. In contrast, in FIG. 6D and FIG. 6E and FIG. 7D and FIG. 7E, the lens has an aspherically designed surface on which the present invention has been applied. Thus, there is an influence of the aspherical surface formation on the lens periphery side, and in addition, there is a little influence of downward movement of the reference point of the aspherically designed surface.

Figure 8A:
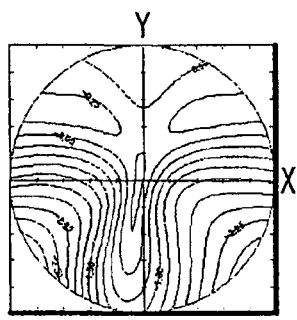
FIG. 8A illustrates the astigmatism and FIG. 8B illustrates the power error.
Figure 8B:
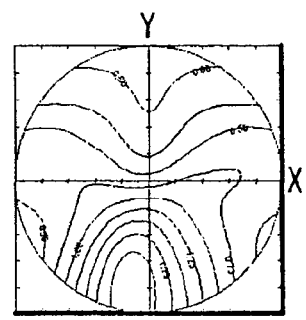

Furthermore, FIG. 8A and FIG. 8B illustrate astigmatism and power error as the transmissive dioptric power on the reference spherical surface which are provided as target performances of the examples shown in FIG. 17 and FIG. 6 and the examples shown in FIG. 18 and FIG. 7, respectively.

It is found that the transmissive dioptric powers of the lenses of FIGS. 6G and 6H, and FIGS. 7G and 7H, each of which has an aspherically designed lens back surface of the present invention, are close to the target performances compared with those of the conventional examples shown in FIGS. 17G and 17H, and FIGS. 18G and 18H. Therefore, it is found that aberration correction is sufficiently carried out in each of these examples.

The invention claimed is:

1. A method of designing a progressive-addition lens, in which a distance dioptric power and an addition dioptric power measured by a lens power measuring apparatus substantially agree with respective prescribed powers, wherein the lens has a progressive surface and an aspherically designed surface formed of an aspherical or atoroidal surface on the back surface of the lens, the method comprising:

calculating an addition dioptric power, a distance dioptric power and a prism dioptric power on the aspherically designed surface under the assumption that a measurement is made by using the lens power measuring apparatus, and calculating respective amounts of deviance of the calculated addition dioptric power, distance dioptric power and prism dioptric power from an addition dioptric power, a distance dioptric power and a prism dioptric power calculated when the back surface of the lens is formed of a spherical or a toroidal surface;

moving the back surface of the lens such that a center of the aspherical or atoroidal surface is moved downward a predetermined distance in a vertical direction while the prism dioptric power at a point, wherein the prism dioptric power is measured, is kept constant when the amount of the deviance of the addition dioptric power exceeds a predetermined threshold;

deforming the back surface of the lens, thereby eliminating the deviated amount of the distance dioptric power when the amount of the deviance of the distance dioptric power exceeds a predetermined threshold; and changing a direction of the back surface of the lens such that a normal line direction at a position corresponding to a prism reference point of the back surface of the lens is changed, thereby eliminating a difference $\Delta Dp$ of the prism dioptric power when the difference $\Delta Dp$ of the prism dioptric power exceeds a predetermined threshold.

2. The method according to claim 1, further comprising moving the back surface of the lens such that a thickness of the lens at the prism reference point becomes a predetermined value.

3. The method according to claim 1, wherein the progressive surface is on a front surface of the lens.

4. The method according to claim 1, further comprising obtaining data for designing a shape of the progressive-addition lens from a storage unit of a data server, designing a shape of the progressive surface and a shape of the aspherically designed surface of the lens, calculating a transmissive dioptric power distribution on a reference spherical surface with respect to the lens shape data for the spherical surface design, calculating the amount of deviance from a desired distribution of the transmissive dioptric power, determining whether the amount of deviance is within a predetermined range, and, when the amount of deviance is not within the predetermined range, correcting the shape of the lens back surface based on the amount of deviance, thereby making the back surface aspherical or atoroidal.

5. The method according to claim 4, wherein the data for designing the lens comprises at least one selected from the group consisting of prescription data, spectacle lens information, and layout information.

6. The method according to claim 4, wherein the prescription data comprises at least one selected from the group consisting of a spherical surface power, cylindrical power, cylindrical axis, prescription prism power, prism base setting, and addition power.

7. The method according to claim 4, wherein the spectacle lens information comprises at least information selected from the group consisting of information about lens materials, refractive index, varieties of optical design for the front and back surfaces of the lens, the center thickness of the lens, the outer diameter of the uncut lens, and prism thinning.

8. The method according to claim 4, wherein the layout information comprises at least information selected from the group consisting of an interpupillary distance, near interpupillary distance, eye point position, and progressive belt length.

9. A progressive-addition lens, in which a distance dioptric power and an addition dioptric power measured by a lens power measuring apparatus substantially agree with respective prescribed powers, wherein the lens has a progressive surface and an aspherically designed surface formed of an aspherical or atoroidal surface on the back surface of the lens, wherein the progressive-addition lens is obtained by a method comprising:

calculating an addition dioptric power, a distance dioptric power and a prism dioptric power on the aspherically designed surface under the assumption that a measurement is made by using the lens power measuring apparatus, and calculating respective amounts of deviance of the calculated addition dioptric power, distance dioptric power and prism dioptric power from an addition dioptric power, a distance dioptric power and a prism dioptric power calculated when the back surface of the lens is formed of a spherical or a toroidal surface;

moving the back surface of the lens such that a center of the aspherical or atoroidal surface is moved downward a predetermined distance in a vertical direction while the prism dioptric power at a point, wherein the prism dioptric power is measured, is kept constant when the amount of the deviance of the addition dioptric power exceeds a predetermined threshold;

deforming the back surface of the lens, thereby eliminating the deviated amount of the distance dioptric power when the amount of the deviance of the distance dioptric power exceeds a predetermined threshold; and changing a direction of the back surface of the lens such that a normal line direction at a position corresponding to a prism reference point of the back surface of the lens is changed, thereby eliminating a difference $\Delta Dp$ of the prism dioptric power when the difference $\Delta Dp$ of the prism dioptric power exceeds a predetermined threshold.

10. The progressive-addition lens according to claim 9, wherein the method further comprises moving the back surface of the lens such that a thickness of the lens at the prism reference point becomes a predetermined value.

11. The progressive-addition lens according to claim 9, wherein the progressive surface is on a front surface of the lens.

12. A method of designing a progressive-addition lens, in which a distance power and an addition power measured by a lens power measuring apparatus substantially agree with respective prescribed powers, having a progressive surface and an aspherically designed surface formed of an aspherical or atoroidal surface, the method comprising:

calculating an addition dioptric power ($ADD_A$) under assumption that a measurement is made by using the lens power measuring apparatus, and calculating an amount of deviance of the calculated addition dioptric power from an addition dioptric power ($ADD_S$) calculated when the back surface of the lens is formed of a spherical or a toroidal surface ($|ADD_A-ADD_S|$);

determining whether or not the amount of deviance is equal to a predetermined threshold or less;

moving the back surface of the lens such that a center of the aspherical or atoroidal surface is moved downward a predetermined distance in a vertical direction while the prism dioptric power at a point where the prism dioptric power is measured is kept constant when the amount of deviance of the addition dioptric power exceeds the predetermined threshold;

calculating the amount of deviance of the addition dioptric power again based on a lens shape of an aspherical surface design after the lens is moved, and repeating the step of moving the back surface of the lens until the amount of deviance is equal to the predetermined threshold or less;

when the amount of deviance of the addition dioptric power is equal to the predetermined threshold or less:

calculating a distance dioptric power under assumption that a measurement is made by using the lens power measuring apparatus, and calculating an amount of deviance of the calculated distance dioptric power from a distance dioptric power calculated when the back surface of the lens is formed of a spherical or a toroidal surface, wherein the amount of deviation of the distance dioptric power includes an amount of deviation of a spherical surface power, an amount of deviation of an astigmatic power and an amount of deviation of cylinder axis;

determining whether or not the amount of deviance of the distance dioptric power is equal to a predetermined threshold or less;

deforming the back surface of the lens to eliminate the deviated amount of the distance dioptric power when the amount of deviance of the distance dioptric power exceeds the predetermined threshold;

when the amount of deviance of the distance dioptric power is equal to the predetermined threshold or less:

calculating a prism dioptric power under assumption that a measurement is made by using the lens power measuring apparatus, and calculating a difference $\Delta Dp$ between the calculated prism dioptric power and a predetermined objective prism dioptric power;

determining whether or not the difference $\Delta Dp$ is equal to a predetermined threshold or less;

changing a direction of the back surface of the lens such that a normal line direction at a position corresponding to a prism reference point of the back surface of the lens is changed to eliminate the difference $\Delta Dp$ when the difference $\Delta Dp$ exceeds the predetermined threshold; and moving the back surface of the lens such that a thickness of the lens at a prism reference point becomes a predetermined value when the difference $\Delta Dp$ is equal to the predetermined threshold or less.

13. A progressive-addition lens, in which a distance power and an addition power measured by a lens power measuring apparatus substantially agree with respective prescribed powers, having a progressive surface and an aspherically designed surface formed of an aspherical or atoroidal surface, the progressive-addition lens is obtained by a method comprising:

calculating an addition dioptric power ($ADD_A$) under assumption that a measurement is made by using the lens power measuring apparatus, and calculating an amount of deviance of the calculated addition dioptric power from an addition dioptric power ($ADD_S$) calculated when the back surface of the lens is formed of a spherical or a toroidal surface ($|ADD_A-ADD_S|$);

determining whether or not the amount of deviance is equal to a predetermined threshold or less;

moving the back surface of the lens such that a center of the aspherical or atoroidal surface is moved downward a predetermined distance in a vertical direction while the prism dioptric power at a point where the prism dioptric power is measured is kept constant when the amount of deviance of the addition dioptric power exceeds the predetermined threshold;

calculating the amount of deviance of the addition dioptric power again based on a lens shape of an aspherical surface design after the lens is moved, and repeating the step of moving the back surface of the lens until the amount of deviance is equal to the predetermined threshold or less;

when the amount of deviance of the addition dioptric power is equal to the predetermined threshold or less:

calculating a distance dioptric power under assumption that a measurement is made by using the lens power measuring apparatus, and calculating an amount of deviance of the calculated distance dioptric power from a distance dioptric power calculated when the back surface of the lens is formed of a spherical or a toroidal surface, wherein the amount of deviation of the distance dioptric power includes an amount of deviation of a spherical surface power, an amount of deviation of an astigmatic power and an amount of deviation of cylinder axis;

determining whether or not the amount of deviance of the distance dioptric power is equal to a predetermined threshold or less;

deforming the back surface of the lens to eliminate the deviated amount of the di stance dioptric power when the amount of deviance of the distance dioptric power exceeds the predetermined threshold;

when the amount of deviance of the distance dioptric power is equal to the predetermined threshold or less:

calculating a prism dioptric power under assumption that a measurement is made by using the lens power measuring apparatus, and calculating a difference $\Delta Dp$ between the calculated prism dioptric power and a predetermined objective prism dioptric power;

determining whether or not the difference $\Delta Dp$ is equal to a predetermined threshold or less;

changing a direction of the back surface of the lens such that a normal line direction at a position corresponding to a prism reference point of the back surface of the lens is changed to eliminate the difference $\Delta Dp$ when the difference $\Delta Dp$ exceeds the predetermined threshold; and moving the back surface of the lens such that a thickness of the lens at a prism reference point becomes a predetermined value when the difference $\Delta Dp$ is equal to the predetermined threshold or less.

* * * * *